(12) United States Patent
Mensch

(10) Patent No.: US 6,725,796 B2
(45) Date of Patent: *Apr. 27, 2004

(54) CONVERTIBLE PONTOON/CAMPER/TRAILER CONSTRUCTION

(76) Inventor: Donald L. Mensch, 314 100th St. SE., Byron Center, MI (US) 49315

( * ) Notice: Subject to any disclaimer, the term of this patent is extended or adjusted under 35 U.S.C. 154(b) by 0 days.

This patent is subject to a terminal disclaimer.

(21) Appl. No.: 10/173,242

(22) Filed: Jun. 17, 2002

(65) Prior Publication Data

US 2002/0148398 A1 Oct. 17, 2002

Related U.S. Application Data

(63) Continuation-in-part of application No. 09/757,931, filed on Jan. 10, 2001, now Pat. No. 6,439,145.

(51) Int. Cl.$^7$ .................................................. B63B 7/00
(52) U.S. Cl. .................... 114/61.18; 114/344; 114/354; 114/362
(58) Field of Search .................. 114/344, 354, 114/361, 362, 364, 61.15, 61.18; 296/26.13, 171, 173, 175

(56) References Cited

U.S. PATENT DOCUMENTS

| | | | |
|---|---|---|---|
| 2,706,642 A | 4/1955 | Yarnell | |
| 2,759,201 A | 8/1956 | McKinney | |
| 2,992,444 A | 7/1961 | Schuler | |
| 3,114,157 A | 12/1963 | Stockmann | |
| 3,199,127 A | * 8/1965 | Hunter | 114/344 |
| 3,210,783 A | * 10/1965 | Petty | 114/344 |
| 3,289,225 A | 12/1966 | Isch | |
| 3,300,796 A | 1/1967 | Powers | |
| 3,329,980 A | 7/1967 | Doty | |
| 3,434,166 A | * 3/1969 | Clymer | 114/361 |
| 3,530,519 A | 9/1970 | Levinson | |
| 3,599,256 A | 8/1971 | Carroll, Jr. | |
| 3,629,884 A | 12/1971 | Brown | |
| 3,673,622 A | 7/1972 | Allen | |
| 3,677,212 A | * 7/1972 | Gregoire | 114/316 |
| 3,744,070 A | 7/1973 | Shaw | |
| 3,758,897 A | 9/1973 | Shaw | |
| 3,763,511 A | 10/1973 | Sisil | |
| 3,779,574 A | 12/1973 | Ow | |
| 3,787,910 A | 1/1974 | Taylor | |
| 3,792,502 A | 2/1974 | Odegaard | |
| 3,797,056 A | 3/1974 | Brady | |
| 3,860,982 A | 1/1975 | Rumsey | |
| 3,877,094 A | 4/1975 | Kelley | |
| 3,925,837 A | * 12/1975 | Miller | 114/352 |
| 3,972,544 A | 8/1976 | Soot | |
| 3,978,536 A | 9/1976 | Howe | |
| 4,023,222 A | 5/1977 | Selby | |

(List continued on next page.)

FOREIGN PATENT DOCUMENTS

FR     2615475     5/1987

OTHER PUBLICATIONS

"A Look At the Future?", Pontoon Deck & Boat magazine, Fall 2000, p. 24.

*Primary Examiner*—Sherman Basinger
(74) *Attorney, Agent, or Firm*—Price, Heneveld, Cooper, DeWitt & Litton, LLP

(57) ABSTRACT

An apparatus is convertible between a pontoon, a camper, and a trailer. The apparatus includes a main frame with longitudinally-extending beams and transverse beams. A retractable wheel frame supporting a double pair of wheels is pivoted to the main frame and is configured to swingingly retract into a center area of the main frame. Side, front and rear pontoons are attached to the main frame, with the side pontoons being extendable laterally to provide increased width to the apparatus. A vertical upright beam is slidably attached to the main frame, and includes a bottom hitch and a top boom, both of which are moved by an actuator attached to the upright beam.

61 Claims, 17 Drawing Sheets

U.S. PATENT DOCUMENTS

| | | |
|---|---|---|
| 4,024,592 A | 5/1977 | Schlagenhauf |
| 4,040,134 A | 8/1977 | Downing |
| 4,048,685 A | 9/1977 | Gail |
| 4,354,290 A | 10/1982 | Tevruchte et al. |
| 4,681,284 A | 7/1987 | Veaux et al. |
| 4,736,702 A | 4/1988 | Gubin |
| 4,754,998 A | 7/1988 | LeJuerrne |
| 4,781,143 A | 11/1988 | Logan |
| 4,869,194 A * | 9/1989 | Cummins .................. 114/344 |
| 4,909,169 A | 3/1990 | Skandaliaris et al. |
| 4,981,100 A | 1/1991 | Bergeron |
| 5,004,260 A * | 4/1991 | Smyly, Sr. ................ 280/414.1 |
| 5,474,009 A | 12/1995 | Ritchie et al. |
| 5,607,330 A | 3/1997 | Hanz |
| 6,003,458 A | 12/1999 | Valliere |
| 6,067,925 A | 5/2000 | Little |
| 6,178,913 B1 | 1/2001 | Brignolio |
| 6,298,802 B1 | 10/2001 | Brignolio |
| 6,439,145 B1 * | 8/2002 | Mensch ................... 114/61.18 |
| 2003/0116072 A1 | 6/2003 | Brignolio |

* cited by examiner

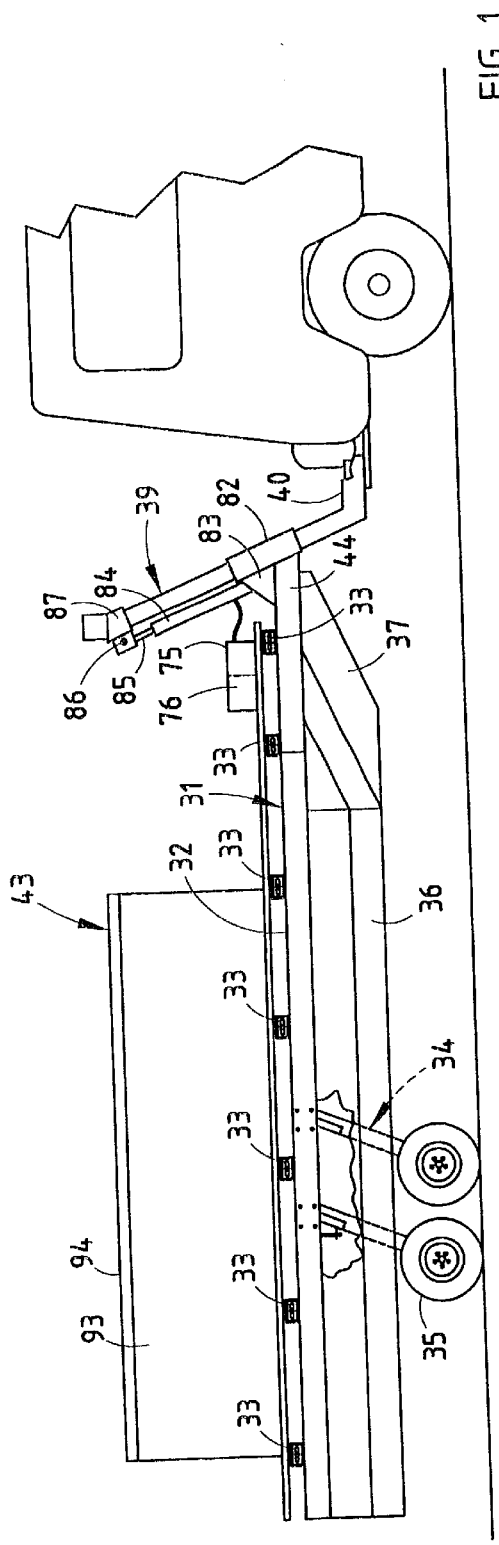
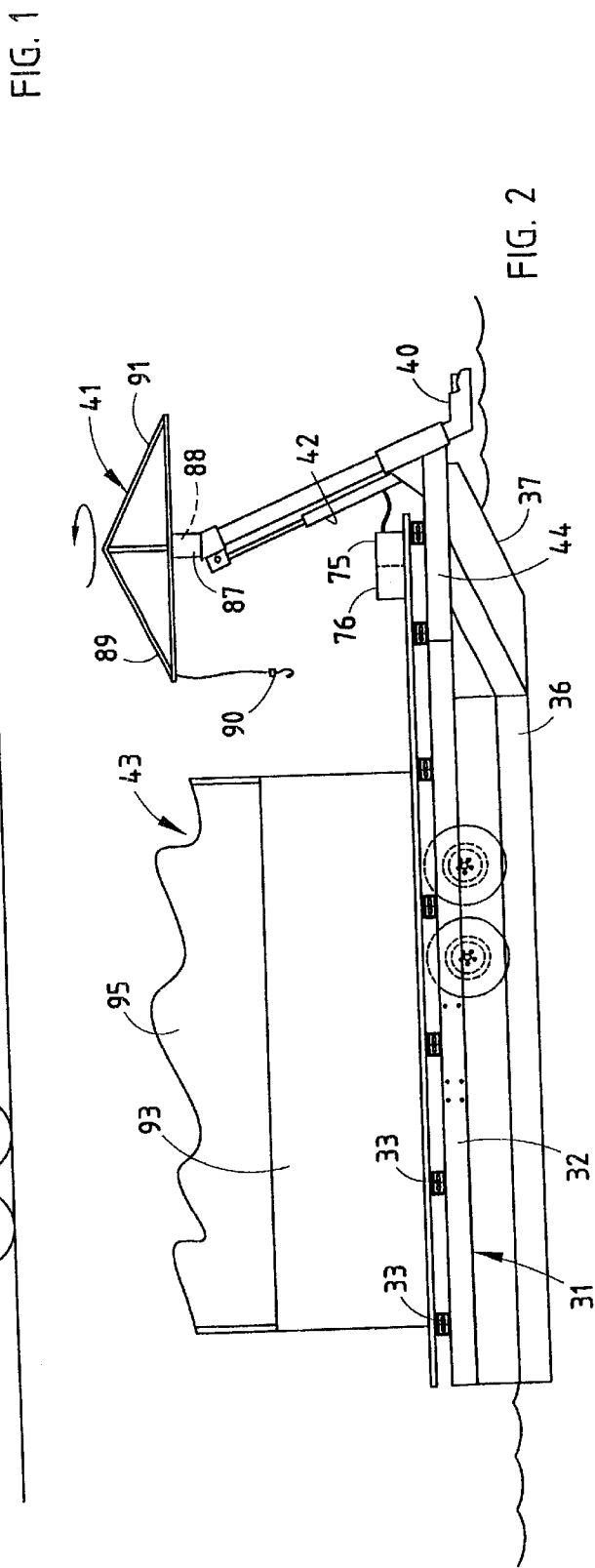

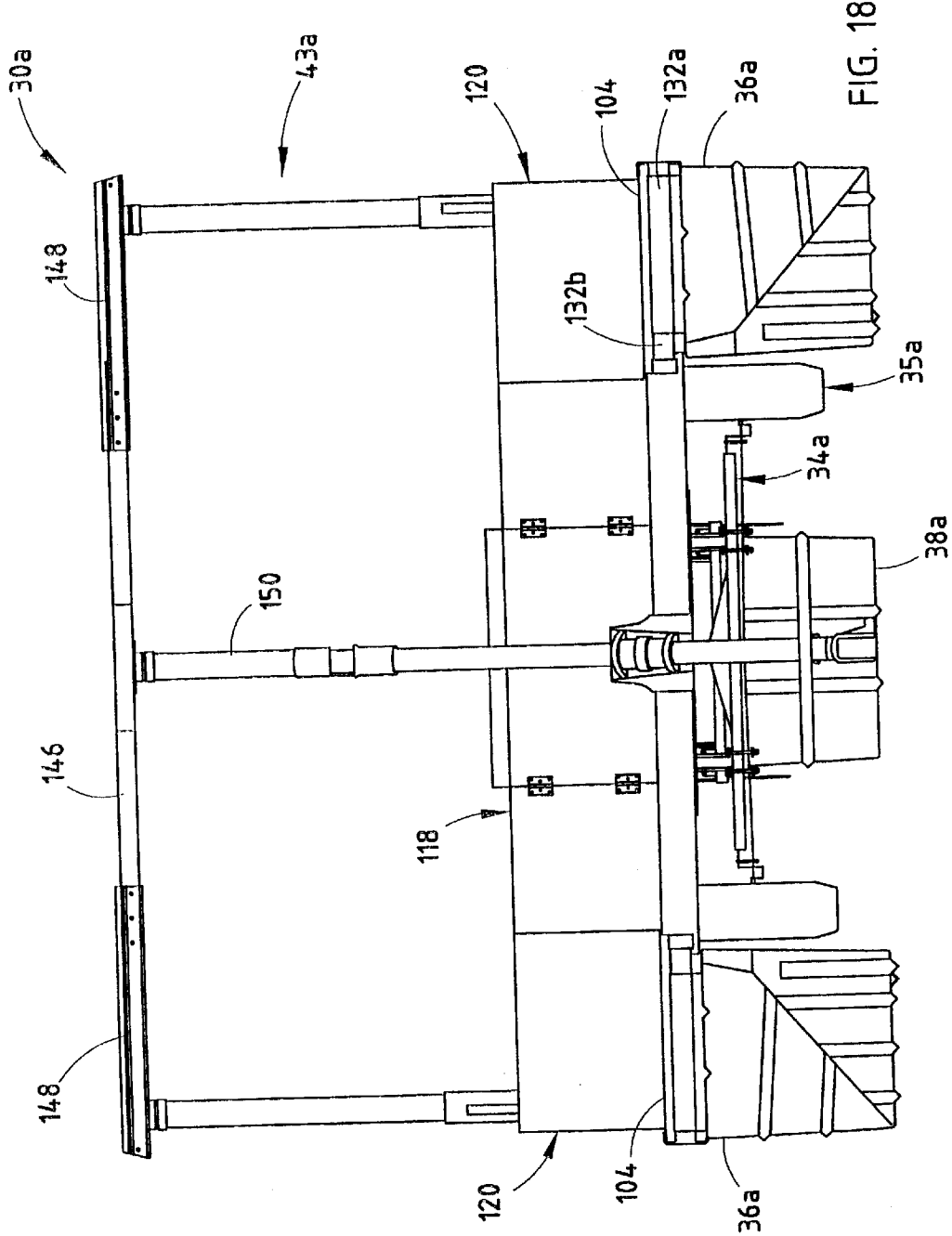

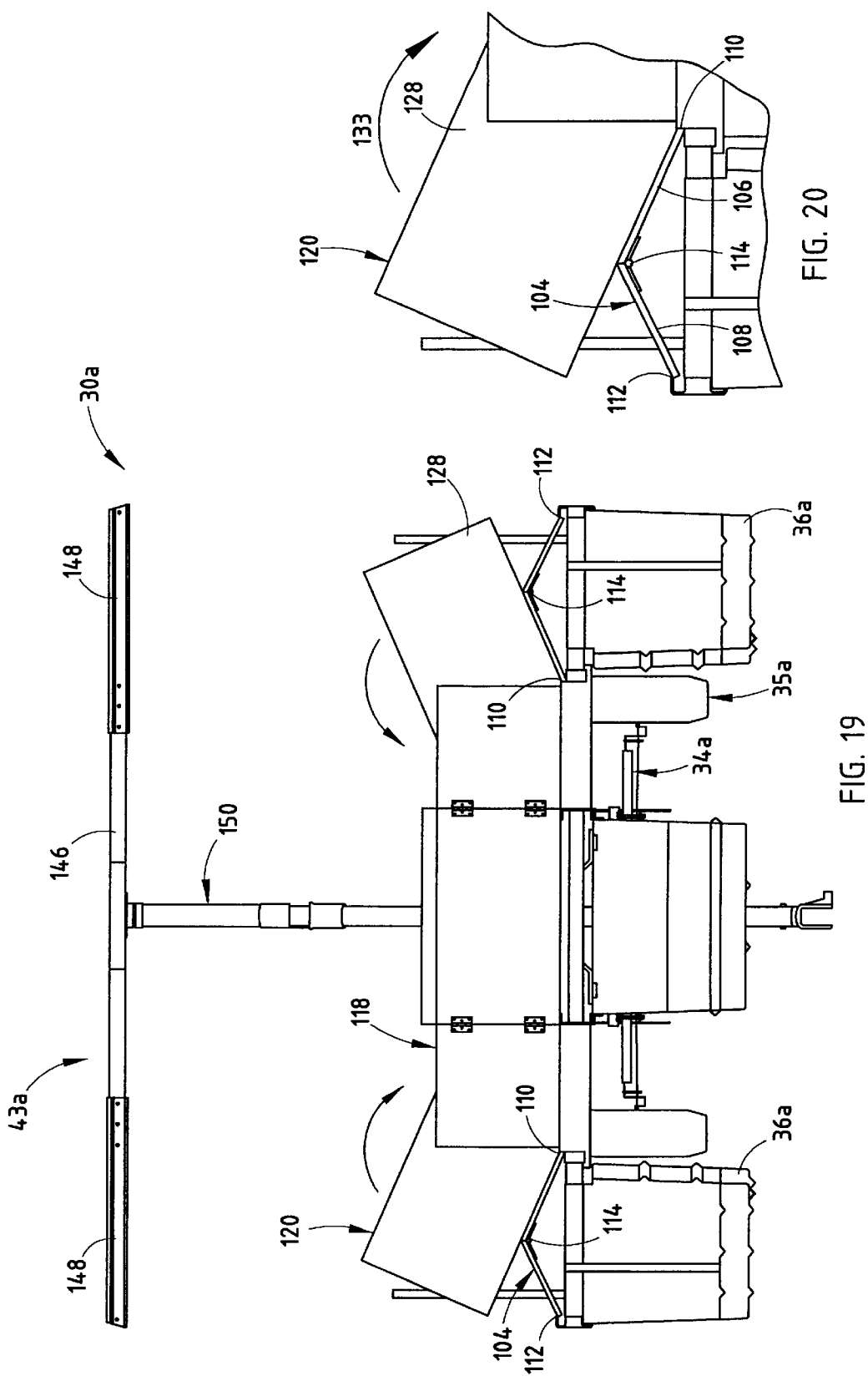

US 6,725,796 B2

CONVERTIBLE PONTOON/CAMPER/ TRAILER CONSTRUCTION

CROSS-REFERENCE TO RELATED APPLICATION

The present application is a continuation-in-part of U.S. application Ser. No. 09/757,931 filed on Jan. 10, 2001, entitled CONVERTIBLE PONTOON/CAMPER/TRAILER CONSTRUCTION, now U.S. Pat. No. 6,439,145, the entire contents of which are hereby incorporated herein by reference.

BACKGROUND OF INVENTION

The present invention relates to an apparatus that is convertible between a pontoon boat, a camper, and a trailer construction. The invention includes aspects relating to a retractable wheel construction, an expandable frame construction, and a retractable hitch/boom construction, but is not limited to only these individual aspects.

It is known to provide a single apparatus convertible between a trailering arrangement and a pontoon arrangement. However, improvements are desired for compact storage of wheels when pontooning, yet stable support when trailering. Specifically, the wheel arrangement needs to provide for optimal stability and safety when trailering. At the same time, the wheel arrangement must be retractable, preferably for very compact storage, so that it does not reduce pontoon speed or become corroded due to contact with water. The wheel arrangement should also preferably be made so that it cannot be accidentally retracted when trailering. Also, the wheel arrangement must be low cost yet high strength, especially for large boat/camper constructions having a length of 30 feet or more. Also, it is desirable to improve the pontoon arrangement for stable flotation even while moving fast enough in the water to plane on the water. Still further, the pontoon deck arrangement should be reliably expandable and contractible despite the wet environment. Specifically, the structure providing the expandability should preferably provide for easy, reliable expansion, yet be mechanically non-complex and durable.

It is also desirable to provide an improved hitch arrangement that positions the hitch preferably out of the water when pontooning, yet that facilitates attachment to a vehicle. At the same time, a mechanical simple boom is desired that can assist in lifting small water craft onto the deck of the craft, such as a ski boat or the like.

It is further desirable to provide an expandable deck that is relatively smooth so that people do not trip on the joint when walking from side deck portions onto a main deck portion. Additionally, it is desirable to provide an expandable roof that provides shade while on the deck and that encourages maximum use of the entire deck. Moreover, it is desirable to provide side panels to prevent persons from accidentally falling off edges of the deck. However, all of these things add considerable weight and complexity and cost to a boating apparatus, potentially pricing the apparatus out of the market. Still further, maintenance and warranty can be problematic.

Accordingly, an apparatus solving the aforementioned problems and having the aforementioned advantages is desired.

SUMMARY OF THE INVENTION

An aspect of the present invention is to provide a pontoon and trailering apparatus comprising a main frame and a roof structure. The main frame includes pontoons, retractable wheels, and a boat motor, with the main frame having opposing sides. The roof structure includes a main roof supported over the main frame and side roof sections operably attached to the main roof. The side roof sections are each telescopingly and movably supported on the main roof for movement between a retracted position where the side roof sections are positioned in a collapsed laminar arrangement with the main roof and an expanded position where the side roof sections are positioned in an outwardly-telescoped parallel arrangement with the main roof.

Another aspect of the present invention is to provide a pontoon and trailering apparatus comprising a main frame and a deck structure. The main frame includes pontoons, retractable wheels, and a boat motor. The main frame has opposing sides and includes retractable side frames that are movable between expanded and retracted positions on the main frame. The deck structure includes a main deck attached to the main frame and side decks attached to the side frames. The side decks are each hinged and foldable. The side decks are configured to move to a folded condition when the side frames are moved to the retracted positions and are configured to move to a flat condition when the side frames are moved to the expanded positions.

In yet another aspect of the present invention, a pontoon and trailering apparatus is provided, with the pontoon and trailering apparatus comprising a main frame and a deck structure. The main frame includes pontoons, retractable wheels, and a boat motor. The main frame has opposing sides and includes retractable side frames that are movable between expanded and retracted positions on the main frame. The deck structure includes a main deck attached to the main frame and side decks attached to the side frames. The side decks are each movable to a retracted position and to an expanded position. The deck includes a partition structure including first partitions attached to the main deck and second partitions attached to the side decks. The first partitions include first overlapping panels and the second partitions include second overlapping panels. The first and second panels are generally aligned and parallel when the side decks are in the expanded position. The first and second panels slide past each other to an overlapped condition when the side decks are moved toward the retracted position.

A further aspect of the present invention is to provide a pontoon and trailering apparatus comprising a main frame, a deck structure and steps. The main frame includes pontoons, retractable wheels, and a boat motor. The main frame has opposing sides and includes retractable side frames that are movable between expanded and retracted positions on the main frame. The deck structure includes a main deck attached to the main frame and side decks attached to the side frames. The side decks are each movable to a retracted condition when the side frames are moved to the retracted positions and are configured to moved to an expanded condition when the side frames are moved to the expanded positions. The steps are attached to one of the pontoons and the side deck. The steps, when the side decks are in the expanded position, lead from the main deck down to water level. Additionally, the steps, when the side decks are in the retracted position, are at least partially covered and protected by one of the main frame and the main deck.

Another aspect of the present invention is to provide a pontoon and trailering apparatus comprising a main frame, an expandable deck structure, an actuator and a remote control. The main frame includes pontoons, retractable wheels, and a boat motor. The main frame has opposing sides and side frames operably connected to the main frame for movement between retracted and expanded positions. The expandable deck structure includes a main deck attached to the main frame and side decks attached to the side frames. The actuator is operably connected to the main frame and is adapted to move the side frames and the side decks between the retracted and expanded positions. The remote control is for operating the actuator for moving the side frames and side decks between the retracted and expanded positions.

Yet another aspect of the present invention is to provide a pontoon and trailering apparatus comprising a main frame, a retractable wheel frame, side pontoons and a center rear pontoon. The main frame includes opposing sides, longitudinally-extending beams and transverse beams supported by the longitudinally-extending beams. The retractable wheel frame includes wheels, axles, and subframe members. The subframe members support the axles and are vertically movably connected to the main frame. The side pontoons are operably supported on the opposing sides by the transverse beams for movement between an outwardly-expanded position where a center area is open for receiving the wheel frame and an inwardly-contracted position where the center area is not sufficiently open to receive the wheel frame. The center rear pontoon has a motor well adapted to hold a boat motor.

In another aspect of the present invention, a pontoon and trailering apparatus is provided, the pontoon and trailering apparatus comprising a main frame, a retractable wheel frame, side pontoons and a rear center pontoon. The main frame includes opposing sides, longitudinally-extending beams and transverse beams supported by the longitudinally-extending beams. The retractable wheel frame includes wheels, axles, and subframe members. The subframe members support the axles and are vertically movably connected to the main frame. The side pontoons are supported on the opposing sides by the transverse beams. The side pontoons are positioned to define a cavity under a center area of the main frame for receiving the wheel frame and wheels. The center rear pontoon has a motor well adapted to hold a boat motor.

These and other features, advantages, and objects of the present invention will be further understood and appreciated by those skilled in the art by reference to the following specification, claims, and appended drawings.

BRIEF DESCRIPTION OF THE DRAWINGS

FIG. 1 is a side view of the present pontoon/camper/trailer apparatus, the apparatus being shown in a trailering arrangement.

FIG. 2 is a side view of the apparatus shown in FIG. 1, with the apparatus being shown in a pontoon arrangement.

FIG. 18 is a front view of the apparatus of FIG. 12 in the fully extended position.

FIG. 19 is a front view of the apparatus of FIG. 12 in a partially extended position.

FIG. 20 is a fragmentary front view of a seat and a side deck of the apparatus of FIG. 19 in the partially extended position.

DETAILED DESCRIPTION OF PREFERRED EMBODIMENT

Figure 3:
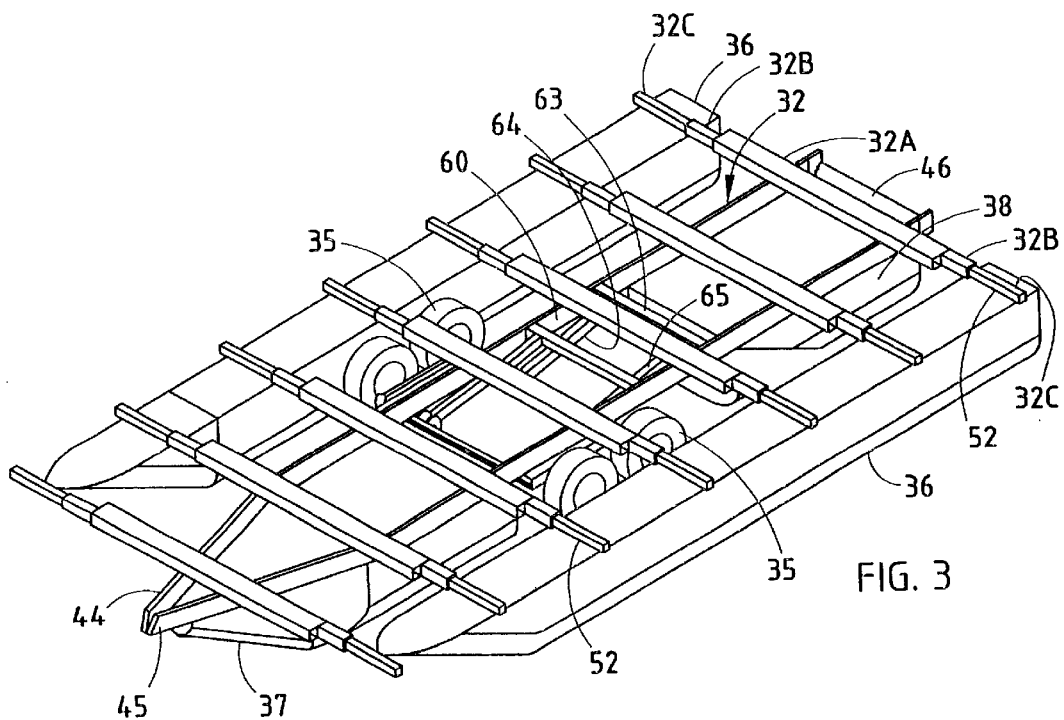
FIG. 3 is a top perspective view of the apparatus shown in FIG. 1, the decking and cabin being removed to show the main frame, pontoons, and wheel frame of the present apparatus.

An apparatus 30 embodying the present invention is convertible between a trailer arrangement (FIG. 1), a pontoon (FIG. 2), and a camper (similar to FIG. 2 but with wheels still extended and hitch lowered). The apparatus 30 includes a main frame 31 (FIG. 3) with longitudinally-extending parallel beams 32 and a plurality of parallel transverse beams 33. A retractable wheel frame 34 supporting wheels 35 is pivoted to the main frame 31 and is configured to swingingly retract into a center area of the main frame 31 (FIG. 2) for pontooning but also swingingly extend for trailering (FIG. 1). Side, front and rear pontoons 36, 37 and 38 (FIG. 3) are attached to the main frame 31, with the side pontoons 36 being extendable laterally to provide increased width to the apparatus 30 when pontooning or using the apparatus for camping. A vertical upright beam 39 is slidably attached to a front of the main frame 31, and includes a bottom hitch 40 and a top boom 41, both of which are moved by a cylinder actuator 42 attached to the upright beam 39. By this arrangement, a compact and stable construction is created for trailering, yet which is expandable and convertible for pontooning or camping in an efficient manner.

The main frame 31 (FIG. 3) includes angled front beams 44 and 45 attached to a front end of longitudinally-extending beams 32 to form a V-front, and further includes a transit beam 46 connected to the rear ends of the longitudinally-extending beams 32 for forming a boat motor mount. The transverse beams 33 include pairs of outer beams 32A that each telescopingly support an intermediate beam 32B which, in turn, telescopingly supports an inner beam 32C. The beams 32A–32C are square in cross section for maximum stability, but it is noted that other cross sections can be used. It is also noted that more or less transverse beams can be used depending on a length of the main frame 31 and upon the load per square foot that is expected of the trailering apparatus 30. It is contemplated that the main frame 31 will be constructed primarily of aluminum square (or rectangular) tubing for high strength yet light weight.

Figure 5:
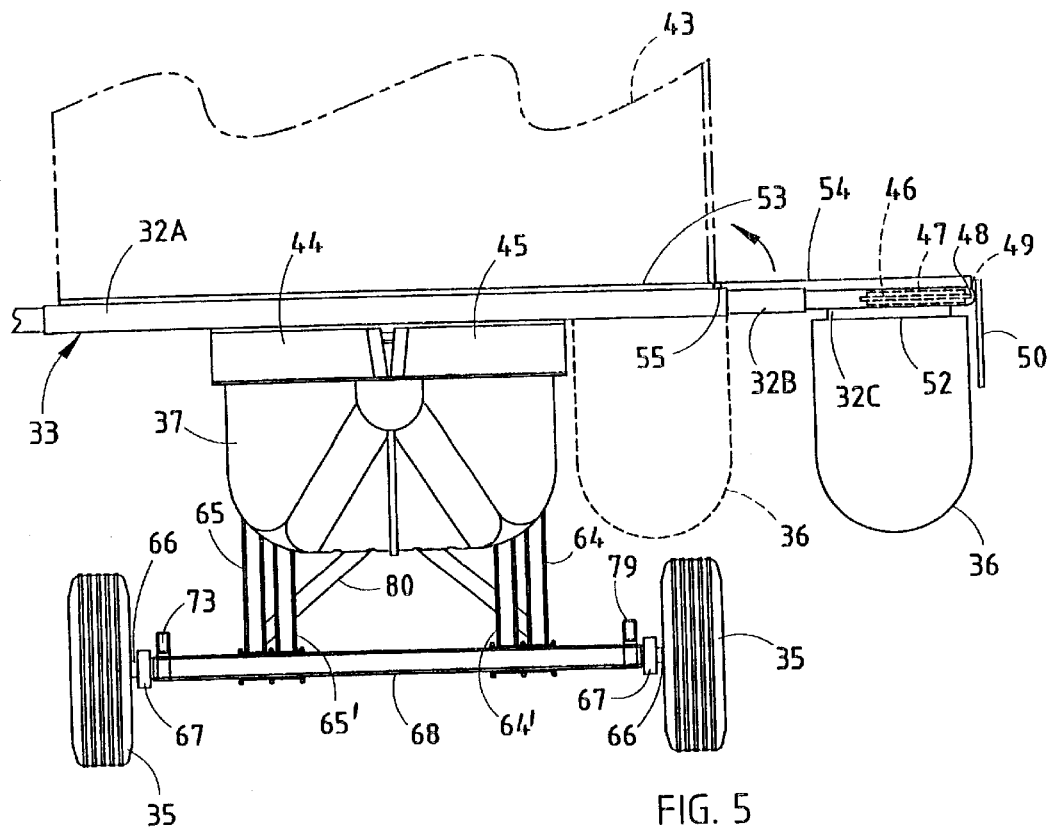
FIG. 5 is a fragmentary front view of FIG. 1.

A pair of wedging members 46 and 47 (FIG. 5) are positioned within the inner tube 32C and a threaded member 48 extends through the wedges 46 and 47 for adjustable wedging engagement within the inner tube 32C. The threaded member 48 includes a head 49 that extends outwardly and a side fascia 50 is attached to the head 49. A bottom outer end of the tubes 32A and 32B are open.

Figure 7:
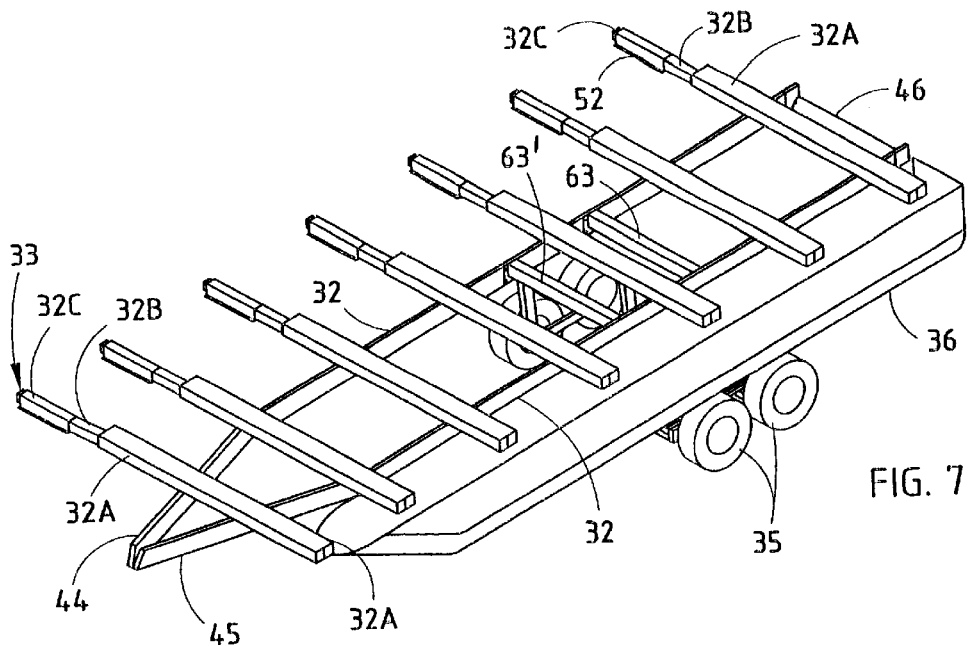
FIG. 7 is a perspective view similar to FIG. 3, but with the center and right pontoons removed to better show the wheel frame, and with the wheel frame in the trailering position.
Figure 9:
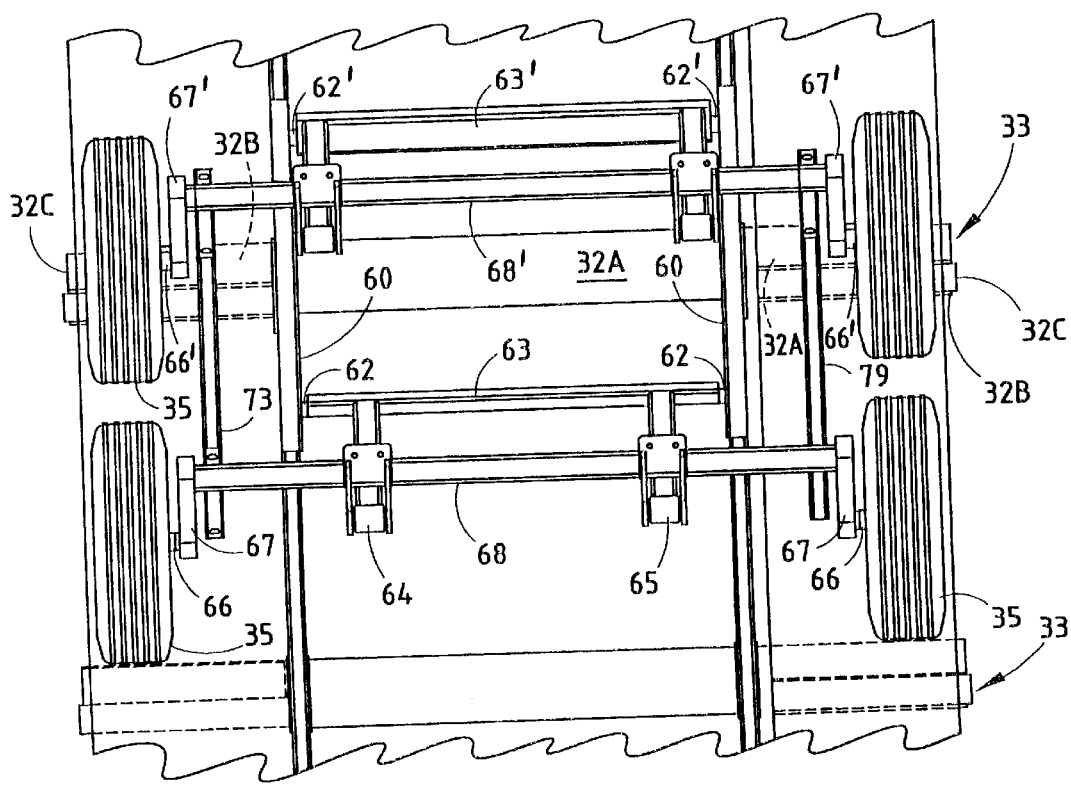
FIG. 9 is a bottom fragmentary view of the apparatus of FIG. 8.

A pontoon-supporting bracket 52 (FIGS. 3, 5, and 7) is attached to the bottom of inner tube 32C and to a top of the side pontoons 36. The open bottoms of tubes 32A and 32B allow the bracket 52 to be telescoped inwardly under the ends of tubes 32A and 32B. This allows a tighter collapsed position of the side pontoons 36 while maintaining a strength and stability of the telescoping tube structure. The triple tube 32A, 32B and 32C provides a more stable support for the expanded deck structure 53. The deck structure 53 is made from panel-like sheeting positioned on the transverse beams 33. The side portions 54 of the decking structure 53 is made collapsible so that the transverse beams 33 can be covered when extended and also the side decking can be collapsed when the tubes 32B and 32C are collapsed. For example, decking 53 is supported on tubes 32A, but the outer side decking 54 is supported on extended tubes 32B and 32C when they are extended. When the tubes 32B and 32C are retracted in the illustrated arrangement, the side decking 54 is pivoted about hinge 55 to position them adjacent a sidewall of the cabin 43.

It is contemplated that the tubes 32B and 32C can be retracted and extended by various means. For example, a cable system (not specifically shown) can be attached to each of these members inside (or outside) of the transverse beams 33 and routed to a single (or multiple) actuator (such as a winch) for operation. Alternatively, a rigid beam can be attached to the ends of each of the beams 32C and hydraulic actuators can be used. Still further, it is contemplated that gears, threaded devices, and electrical or mechanical actuators can be used.

The shape and construction of pontoons 36–38 do not need to be described for an understanding of the present invention. It is sufficient to note that various pontoon shapes and sizes can be designed as desired to provide different riding comfort and speeds. In the present pontoons 36–37, an angled front surface is used on all four pontoons to provide better planing on water when the boat is moving at a rapid pace. It is noted that various longitudinally-extending grooves and ribs (see FIG. 5) are used along a bottom and side of the present pontoons for improved stability and tracking in the water. It is also noted that the pontoons can include square, flat or rounded bottom surfaces, and further that the side pontoons can be located at an optimal height relative to the center pontoon for improved stability of the present apparatus 30 when in the water. In the present case, it is noted that the pontoons 37 and 38 and also the side pontoons 36 provide a large amount of storage space that is well-distributed around the main frame 31 for good trailering and pontooning. In particular, the center front and rear pontoons 37 and 38 provide a significant amount of accessible storage area. It is noted that the decking 53 can include removable hatches or doors for access to the interior space of these pontoons. It is contemplated that various known means can be used to prevent water from entering the pontoons and/or for removing water from inside the pontoons, such as sump pumps, baffles, and the like.

A bracket 60 is attached to an inside of the longitudinal beams 32 and includes inwardly extending pivot pins 61 and 62. Where the longitudinally-extending beams are aluminum for light weight, and where the wheel frame 34 is steel, a gasket or spacer must be used to separate the two dissimilar metals to prevent corrosion. The wheel frame 34 includes a tubular cross beam 63 with a bearing at each end that pivotally engages the respective pivot pins 61, and further includes a pair of downwardly-extending side frame members 64 and 65 fixedly attached to the cross beam 63 near pivots 61, and still further includes a lower tubular cross beam 68 pivotally attached to a bottom of the side frame members 64 and 65. An axle 66 supports each of the wheels 35, and the axle 66 is in turn supported by a torsion arm 67 and an internal torsion spring device 69 on the lower cross beam 68. The lower ends of beams 64 and 65 are pivotally connected to a forward side of the cross beam 68 by an attachment bracketry arrangement 69A. This arrangement positions the beams 64 and 65 at a better location when the wheel frame 34 is retracted to a storage position, such that the cross beam 68 fits more compactly into and nests better inside of a center area of the main frame 31. (See FIG. 3)

Figure 8:
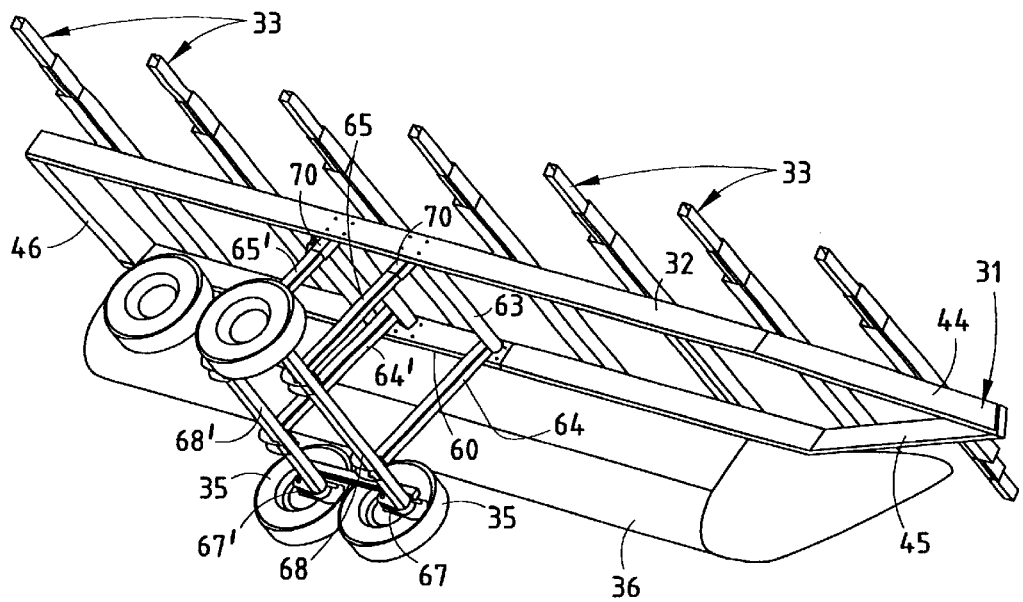
FIG. 8 is a bottom perspective view of the apparatus shown in FIG. 7.
Figure 8A:
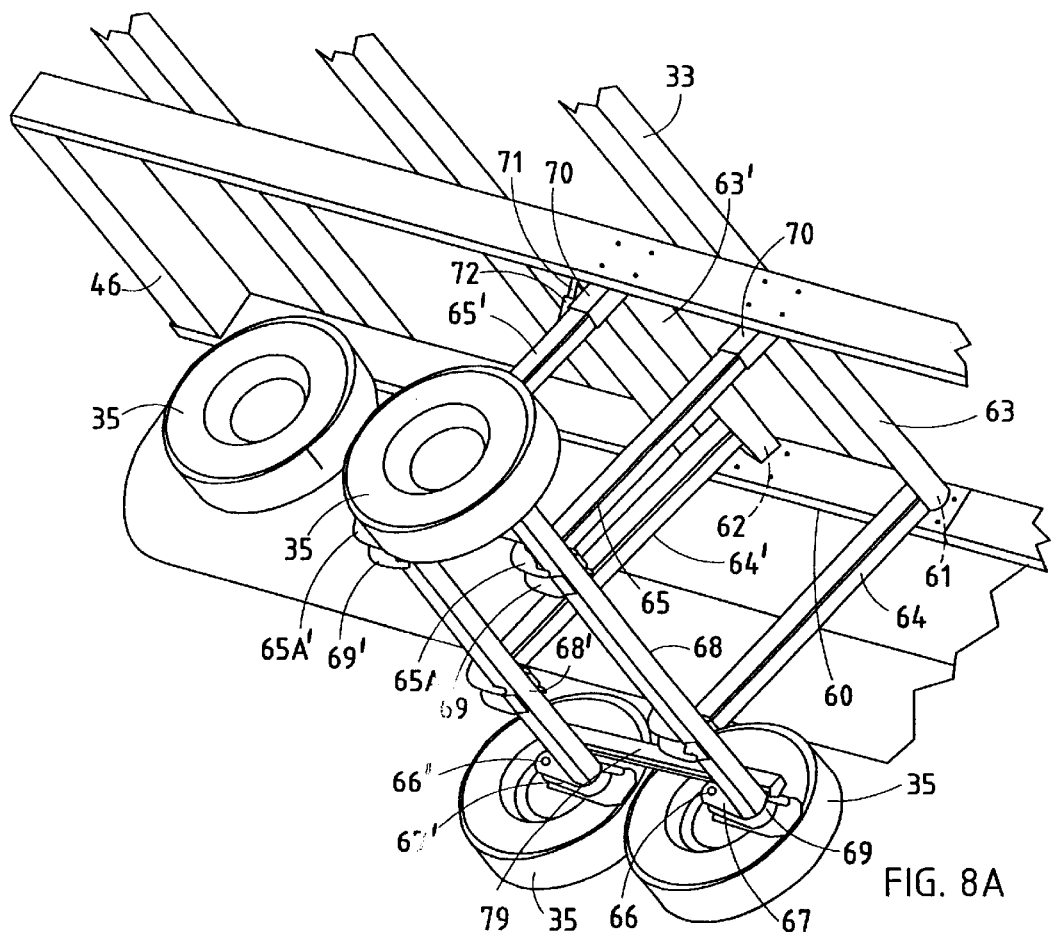
FIG. 8A includes an enlarged fragmentary perspective view of the wheel frame assembly shown in FIG. 8.
Figure 10:
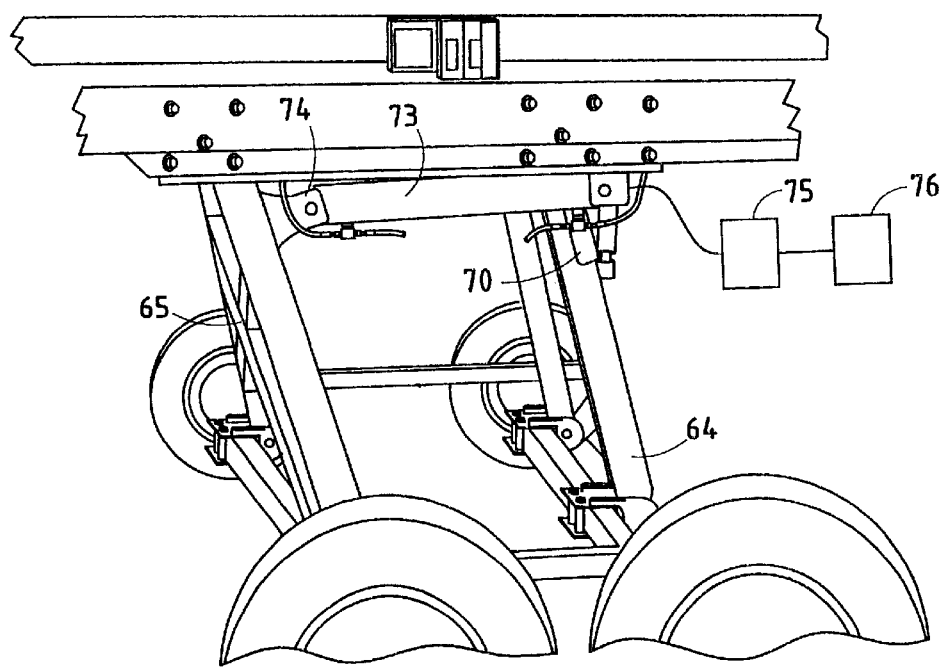
FIG. 10 is a fragmentary perspective view of the wheel frame in the trailering position.
Figure 11:
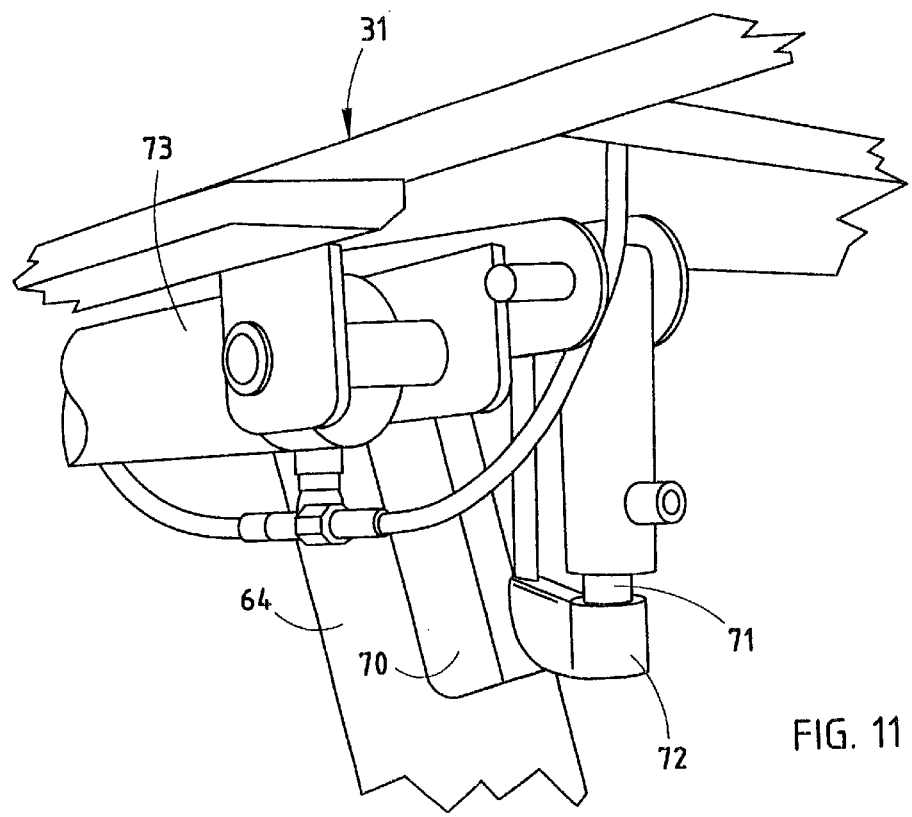
FIG. 11 is a side view of the interlock pin for retaining the wheel frame in the trailering position.
Figure 12:
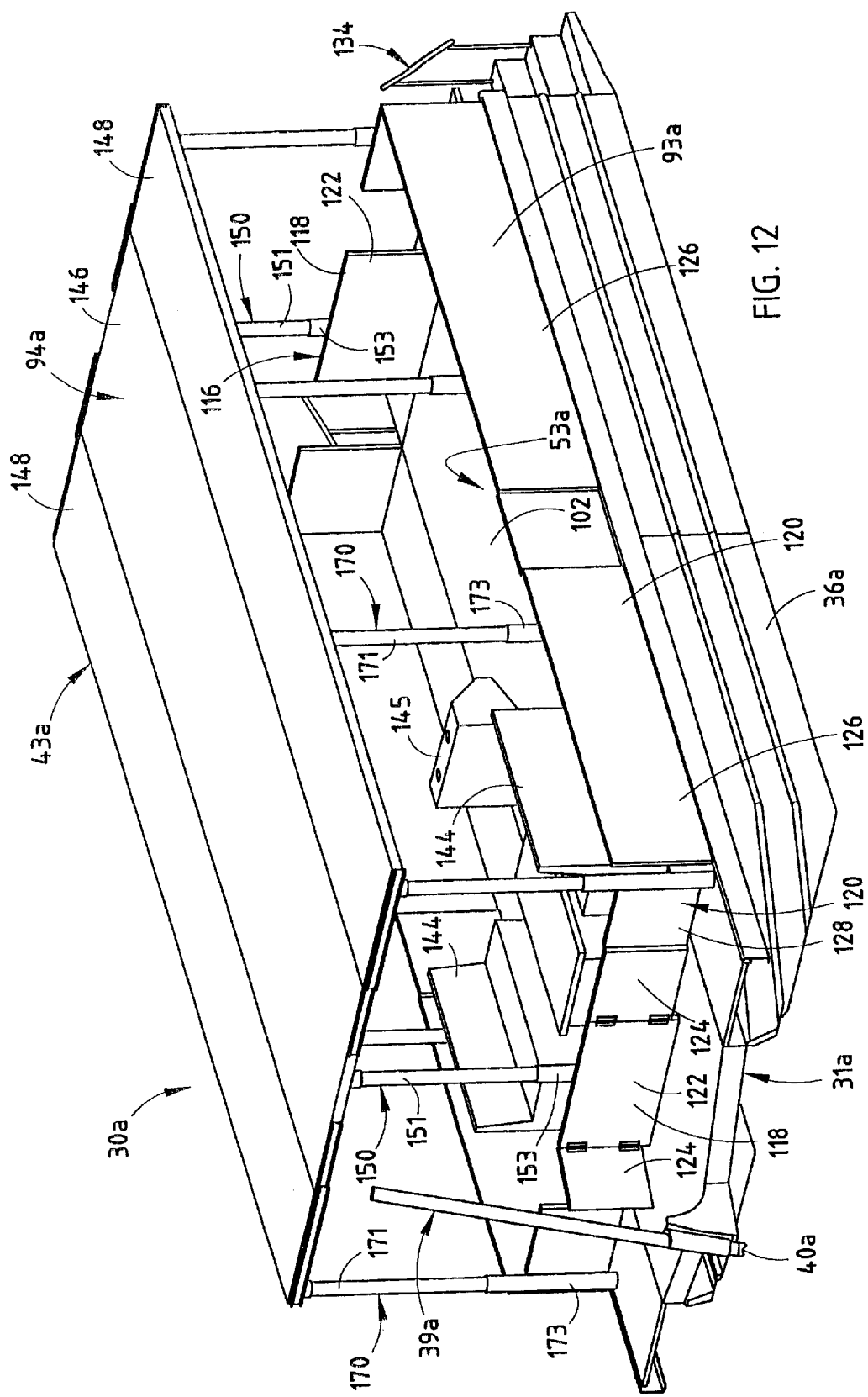
FIG. 12 is a top front perspective view of a second embodiment of the present pontoon/camper/trailer apparatus in a fully extended position.

U-shaped guide brackets 70 (FIGS. 8A, 10, and 11) are attached to the longitudinal beams 32 to receive the beams 64 and 65 when the wheel frame 34 is moved to the extended ground engaging position as shown in FIG. 8A. The brackets 70 include side flanges that engage sides of the beams 64 to stabilize the wheel frame 34 when in the retracted/stored position for improved trailering.

An extendable pin 71 is attached to the longitudinally-extending beam(s) 32 and a pocket bracket 72 is attached to the down beams 64. When the wheel frame 34 is extended, the pin 71 is extendable to engage the pocket bracket 72 to secure the wheel frame 34 in the ground engaging extended position. A hydraulic cylinder 73 with extendable rod 74 (FIG. 10) is operably connected between the main frame 31 and the wheel frame 34. The cylinder 73 is connected to a pump actuating mechanism 75, such as a hydraulic pump. The fluid motivating member of pump 75 is further connected to the generator 76 on the main frame 31 (see FIG. 1). The members 63–65 form a rigid and stable front subframe. A similar second (rear) subframe is shown by members 63'–65', and it includes members 66'–69' similar to members 66–69 discussed above. The front and rear subframes are interconnected by fore/aft frame members 79 for simultaneous pivoting. Specifically, the frame members 79 rigidly interconnect the front cross beam 68 and rear cross beam 68'. It is contemplated that the present invention includes more or less wheels as needed for the particular apparatus being constructed.

Figure 6:
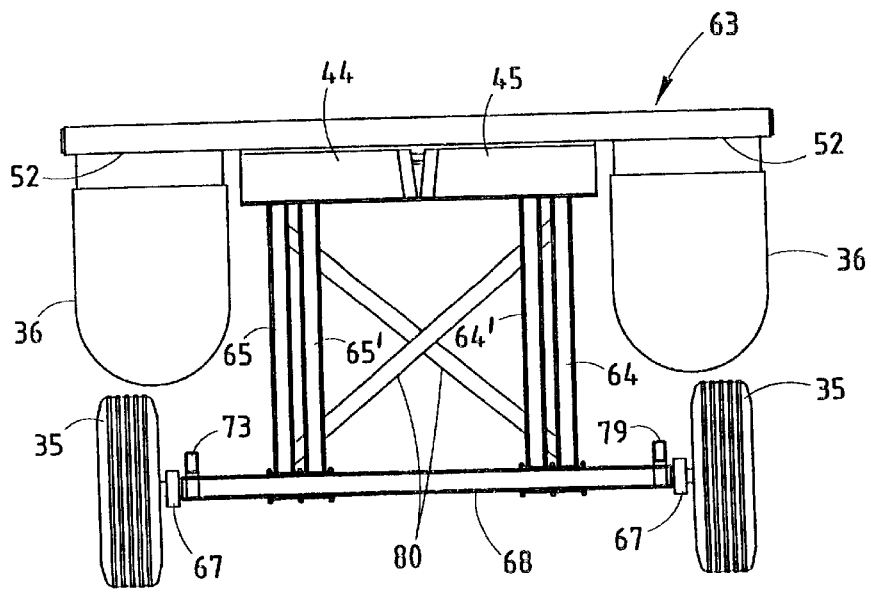
FIG. 6 is a front view similar to FIG. 5, but with both side pontoons retracted for trailering and with the center pontoons removed to better show the wheel frame.

When collapsed (FIG. 3) the rear subframe fits within the front subframe, which in turn, fits within and partially between the longitudinally-extending beams 32 under the center area of the main frame 31. Where additional stability of the front and/or rear subframes is desired, X-type cross-bracing 80 (FIG. 6) can be used. In the illustrated embodiment, the cross-bracing 80 are square tubular members that are somewhat smaller in cross section than the frame members 63–69. The cross-bracing 80 is welded near a lower side of the tubes 64–65 when the wheel frame 34 is in the retracted storage position. This allows better nesting which results in a closer, more compact storage. At the same time, the cross-bracing prevents the subframes from being moved upwardly to an overcenter condition where the cylinder 73 cannot operate to extend the wheel frame 34.

A square tube section 82 is welded to a front of the angled beams 44 and 45 on the main frame 31. Bracing 83 stiffens the tube 82 and rigidifies it on the main frame 31. The upright beam 39 has a square cross section and extends slidably through the tube section 82. It is supported by linear bearings as needed. The actuator 42 includes a cylinder 84 pivotally connected to the bracing 83 and further includes an extendable rod 85 pivotally connected by bracket 86 to a top end 87 of the upright beam 39. The cylinder 84 is operably connected to the hydraulic device 75 for retraction (FIG. 1) and extension (FIG. 2). By operating the actuator 42, the hitch 40 can be moved between a lowered position for trailering (FIG. 1) (or for camping) and a raised position for pontooning (FIG. 2) where the hitch 40 is located out of the water. Further, it is contemplated that the hitch can be covered such as by a waterproof bag or the like. It is contemplated that boom 41 can be provided which includes a lower rod 88 that pivotally engages the upper end 87 of the upright beam 39. The boom further includes a front portion 89 having a hook or grabbing mechanism 90 on one end and a rearwardly protruding section 91 that can include a means for attaching a counterweight to offset the weight of the device being lifted. By this arrangement, the hydraulic cylinder 42 can be used to raise and lower the boom 41. For example, this can be used to load a powered water ski/boat or other device onto a front of the apparatus 30 and/or to unload the same.

It is contemplated that various cabin arrangements can be provided. The illustrated cabin 43 includes rigid box-like sidewalls 93 and an extendable "pop" top 94 with tent-like sidewalls 95 or screening therebetween. It is contemplated that various amenities such as a refrigerator, an oven, lights, a winch, furniture, bedding, and the like can be provided within or around the cabin 43.

MODIFICATION

The reference numeral 30*a* (FIGS. 12–14A) generally designates a second preferred embodiment. Since apparatus 30*a* is similar to the previously described apparatus 30, similar parts appearing in FIGS. 1–11 and FIGS. 12–22, respectively, are represented by the same, corresponding reference numeral, except for addition of the suffix "a" to the numerals of the latter. The apparatus 30*a* includes a main frame 31*a* and a cabin 43*a*. The main frame 31*a* includes side pontoons 36*a* and a rear pontoon 38*a*. The main frame 31*a* includes retractable side frames or beams 132A–132C that are movable between expanded and retracted positions on the main frame 31*a*. The side frames or beams 132A–132C are identical in function to the previously discussed beams 32A–32C of the first embodiment except that the side frames or beams 132A–132C are illustrated as being circular instead of square. The main frame 31*a* also includes a retractable wheel frame 34*a* having wheels 35*a*. Additionally, the main frame 31*a* includes a center rear pontoon 38*a* having a motor well 101 adapted to hold a boat motor 100.

The illustrated main frame 31*a* has a retracted position wherein the inner side frames or beams 132A and the intermediate side frames or beams 132B are located within the outer side frames or beams 132A (see FIGS. 13A, 14 and 14A) and an extended position wherein the inner side frames or beams 132A and the intermediate side frames or beams 132B are fully extended out of the outer side frames or beams 132A (see FIGS. 12, 13, 15, 18 and 22). The side frames or beams 132A–132C are also considered to be in a retracted position when the main frame 31*a* is in the retracted position and in an expanded position when the main frame 31*a* is in the expanded position. The apparatus 30*a* is preferably used as a pontoon boat when the main frame 31*a* is in the expanded position and the wheel frame 35*a* not extended, a cabin when the main frame 31*a* is in the expanded position and the wheel frame 35*a* is extended, and a trailer wherein the main frame 31*a* is in the retracted position and the wheel frame 35*a* is extended.

In the illustrated example, the cabin 43*a* includes deck structure 53*a* positioned on beams 132A–132C of the main frame 31*a*. The deck structure 53*a* includes a main deck 102 attached to outer beams 132A of the main frame 31*a* and side decks 104 attached to the inner beams 132C. The main deck 102 is a flat plate such as a lightweight aluminum or plastic laminate or extrusion attached to the top of the outer beams 132A. The side decks 104 (of similar material) preferably include a first side deck member 106 and a second side deck member 108. The first side deck member 106 is pivotally attached to the main deck 102 at a first pivot point 110. The second side deck member 108 is pivotally attached to the end of the inner beams 132C at a second pivot point 112 and to the first side deck member 106 at a third pivot point 114. The third pivot point 114 is preferably an interrupted or continuous piano hinge that includes a spring bias forcing the hinge closed. As illustrated in FIGS. 19 and 20, as the main frame 31*a* is moved from the expanded position to the retraced position, the first side deck member 106 and the second side deck member 108 will pivot upward about the first pivot point 110 and the second pivot point 112, respectively. The first side deck member 106 and the second side deck member 108 will also pivot against the bias of the spring of the third pivot point until the first side deck member 106 and the second side deck member 108 are side by side in a vertical position when the main frame 31*a* is in the retracted position. Therefore, the side decks 104 will be in a folded condition or retracted position when the main frame 31*a* is in the retracted position and in a flat condition, or expanded position when the main frame 31*a* is in the extended position. The side deck members 106 and 108 can be latched in a down position at point 114 against the bias of spring bias of the hinge at point 114 if desired.

Figure 21:
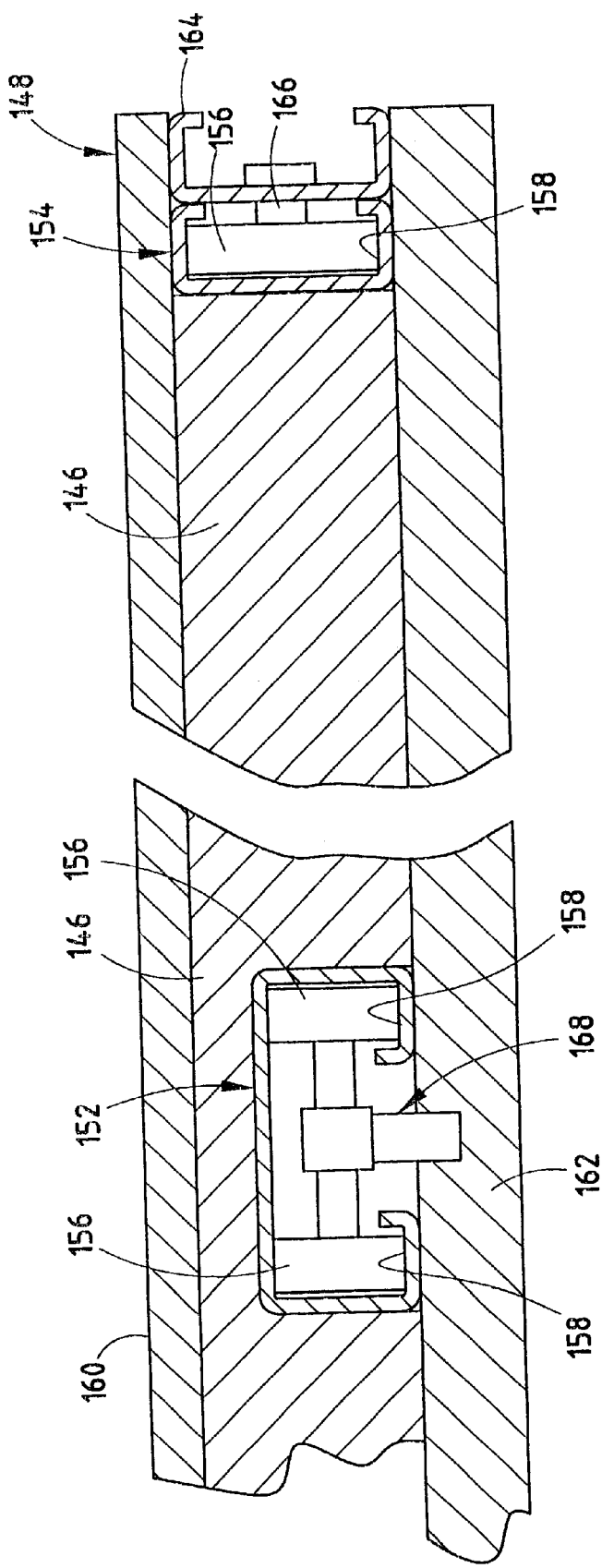
FIG. 21 is a cross-sectional view of the roof taken along line XXI—XXI of FIG. 13.

The illustrated deck structure 53*a* includes a partition structure 116 surrounding a periphery of the deck structure 53*a*. The partition structure 116 includes first partitions 118 attached to the main deck 102 and second partitions 120 attached to the side decks 104 and the side pontoons 36*a*. The first partitions 118 are preferably flat panels 122 extending upward from a front and rear area of the main deck 102 and can include door panels 124 hinged to the flat panels 122. The second partitions 120 include outer panels 126 connected to the outside of the side pontoons 36*a* and folding panels 128 connected to tops of the side decks 104. Walkways 130 or door panels 124 can be positioned between the folding panels 128 and the flat panels 122. As illustrated in FIGS. 20 and 21, when the main frame 31*a* moves to the retracted position, the second side deck member 108 will rotate upward. As the second side deck member 108 rotates upward, the folding panels 128 connected to the second side deck member 108 will also rotate along arrow 133. When the main frame 31 is in the retracted position, the folding panels 128 are located in front of (or behind) the flat panels 122. Also, if present, the door panels 124 of the first partitions 118 are positioned in an overlapped condition with the flat panels 122.

The illustrated apparatus 30a includes steps 134 attached to the ends of the side pontoons 36. The steps 134 preferably include three treads 136, four risers 138 and a hand rail 140 along one side of the steps 134. The steps 134, when the side decks 104 are in the expanded position, lead from the main deck 102 down to water level. Notably, the steps 134, when the side decks 104 are in the retracted position, are covered and protected by extending portions 142 of the main deck 102. It is further contemplated that the steps 134 could be connected to the side deck 104 and could be covered by a portion of the main frame when the apparatus 30a is in the retracted position.

In the illustrated example, the apparatus 30a includes an extendable "pop" top or roof structure 94a positioned above the deck structure 53a for covering people, chairs 144, a steering console 145 and other items located below the roof structure 94a. The roof structure 94a includes a main roof 146 supported over both the main frame 53a and the main deck 102. The roof structure 94a also includes side roof sections 148 operably attached to the main roof 146. The side roof sections 148 are telescopingly and movably supported on the main roof 146 for movement between a retracted position (FIGS. 13A, 14 and 14A) where the side roof sections 148 are positioned in a collapsed laminar arrangement with the main roof 146 and an expanded position (FIGS. 12, 13, 15, 18 and 22) where the side roof sections 148 are positioned in an outwardly-telescoped parallel arrangement with the main roof 146.

The illustrated main roof 146 of the roof structure 94a is connected to the deck structure 53a by a plurality of extendible posts 150 extending between the deck structure 53a and the main roof 146 at the front and rear of the apparatus 30a. Although only two extendible posts 150 are illustrated, it is contemplated that more or less posts 150 can be used, depending on the side of the roof structure 94a. The illustrated posts 150 include a pair of telescoping rods 151 and 153 that have a retracted position (FIGS. 13A, 14 and 14A) for stabilizing the roof structure 94a when in a down position and an extended position (FIGS. 12, 13, 15, 18–20 and 22) for stabilizing the roof structure 94a when in an up position. The posts 150 preferably have a detent or lock for maintaining the posts in either the up or the down position.

In the illustrated example, the main roof 146 includes at least one downwardly opening C-shaped bracket 152 and a side opening C-shaped bracket 154 adapted to accept rollers 156 of the side roof sections 148. The downwardly opening C-shaped bracket 152 is embedded into the main roof 146 and includes a pair of first roller surfaces 158 supporting some of the rollers 156 of the side roof sections 148. The side opening C-shaped bracket 154 is connected to the front and rear edges of the main roof 146 and includes a second roller surface 158 for supporting rollers 156 of the side roof sections 148. In a preferred embodiment, the main roof 146 and the side roof sections 148 include mating detents, such as "up" ridges or bumps, that are configured to maintain the side roof sections 148 in the extended position.

As illustrated in FIG. 21, the side roof sections 148 include an upper side roof panel 160 adapted to slide over the main roof 146 and a lower side roof panel 162 adapted to slide under the main roof 146. The upper side roof panel 160 and the lower side roof panel 162 are connected at front and rear edges by a roller retaining bracket 164. The roller retaining bracket 164 includes an axle 166 extending into the side opening C-shaped bracket 154 of the main roof 146. The axle 166 holds one of the rollers 156 and allows upper side roof panel 160 and the lower side roof panel 162 slide over and under, respectively, the main roof 146. The lower side roof panel 162 also includes a T-shaped bracket 168 extending from a top surface thereof and into the downwardly opening C-shaped bracket 152. Ends of the top of the T-shaped bracket 168 include rollers 156 adapted to roll on the first roller surfaces of the downwardly opening C-shaped bracket 152 for supporting the lower side roof panel 162.

Figure 13:
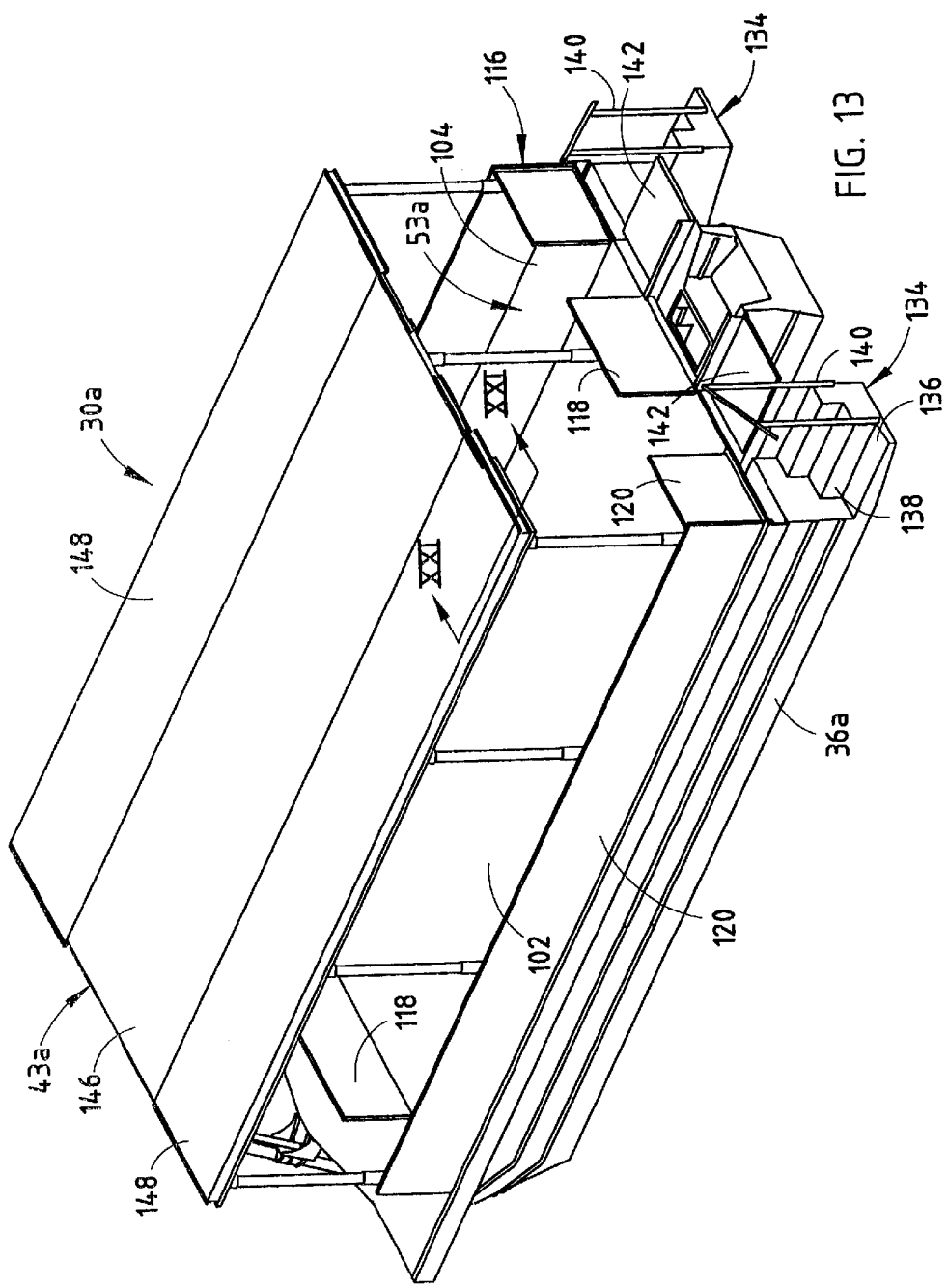
FIG. 13 is a top rear perspective view of the apparatus of FIG. 12 in the fully extended position.
Figure 13A:
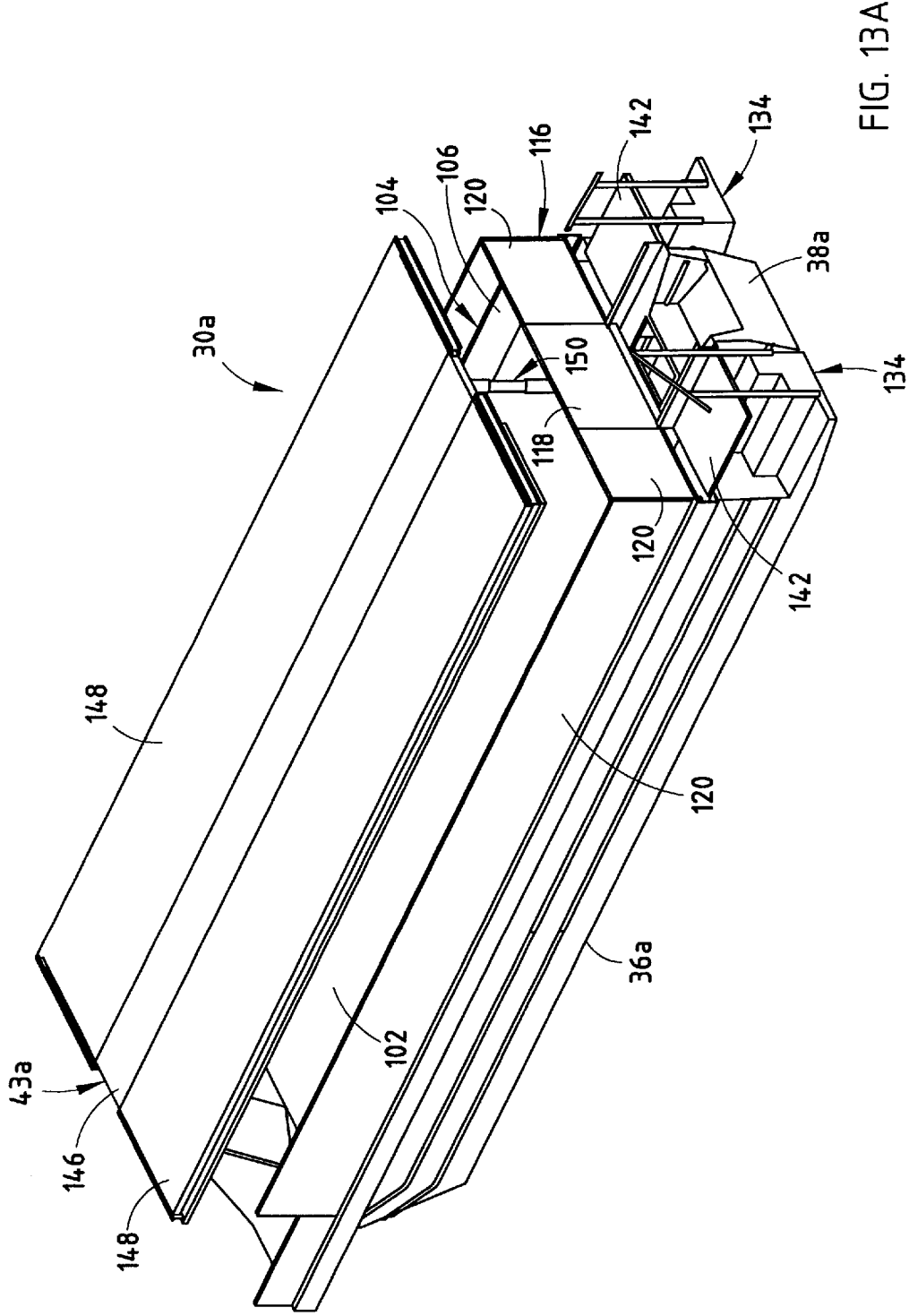
FIG. 13A is a top rear perspective view of the apparatus of FIG. 12 in a fully retracted position.
Figure 14:
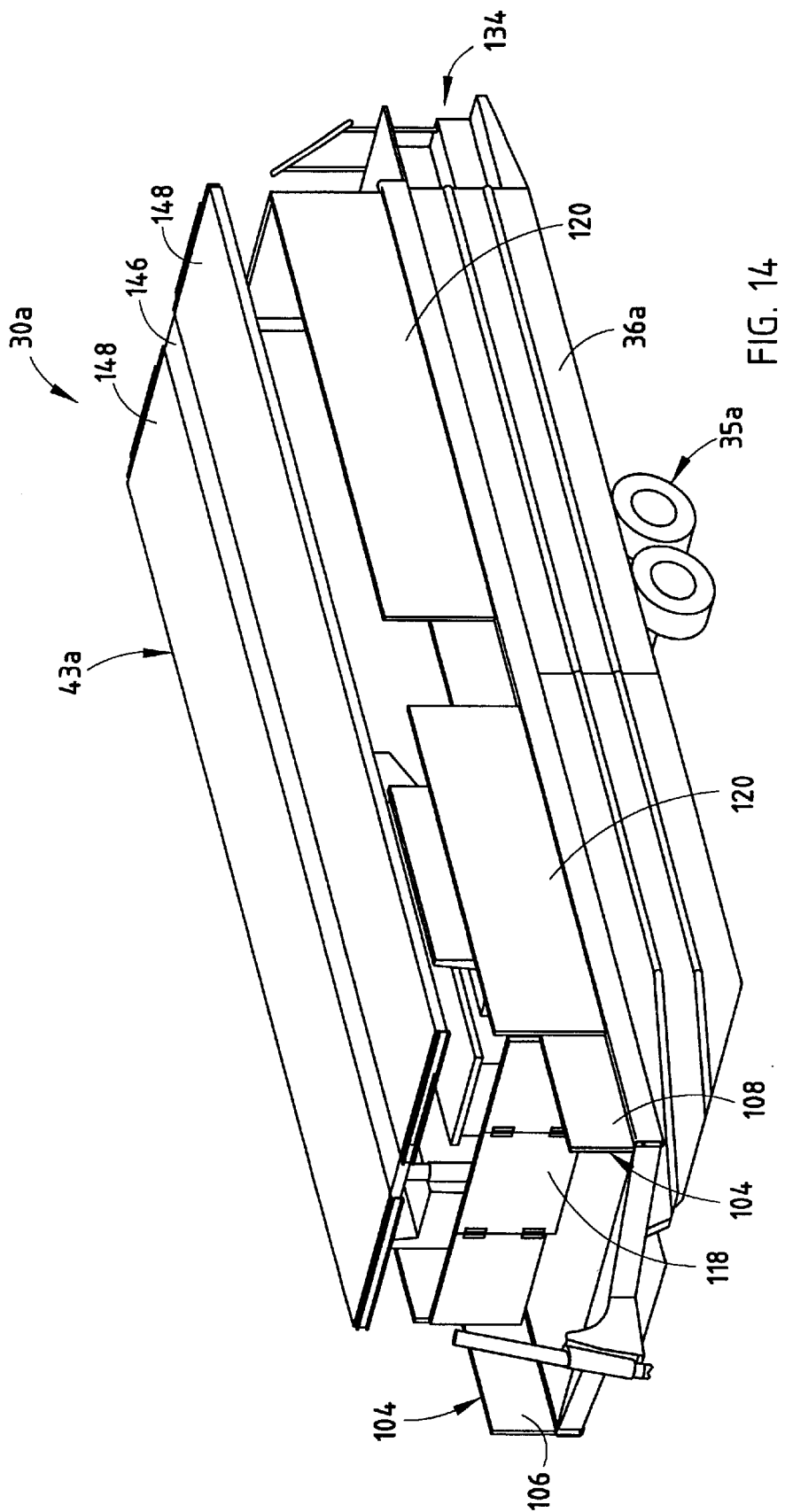
FIG. 14 is a top front perspective view of the apparatus of FIG. 12 in a fully retracted position.
Figure 14A:
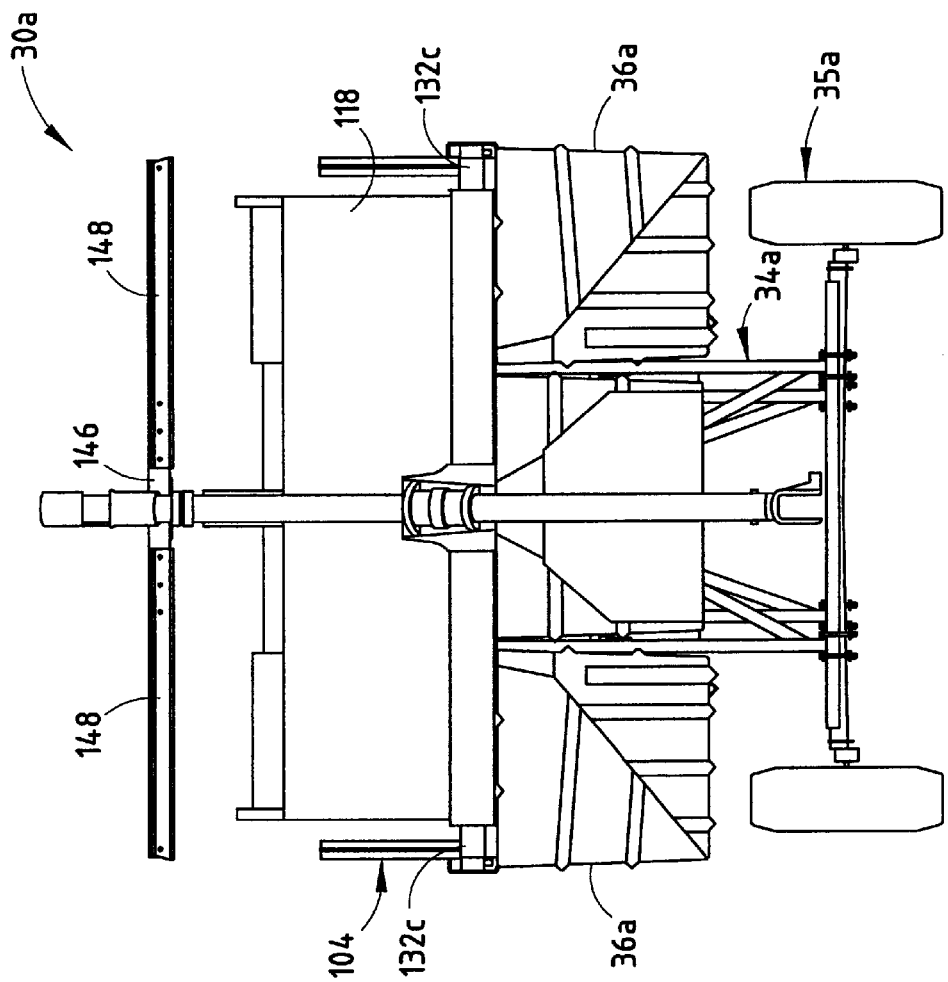
FIG. 14A is a front view of the apparatus of FIG. 12 in a trailering arrangement.

In the illustrated example, the apparatus 30a includes a plurality of removable posts 170 extending between the side roof sections 148 and the side deck 104. The posts 170 include a pair of telescoping rods 171 and 173 that have an extended position (FIGS. 12, 13, 15, 18–20 and 22) for maintaining the roof structure 94a in an up position. The posts 170 preferably have a detent or lock for maintaining the posts in either the up or the down position. The posts 170 can be wedged into position between the side roof sections 148 and the side deck 104 or can have structure adapted to mate with mating structure on the side roof sections 148 and the side deck 104. As illustrated in FIGS. 13A, 14 and 14A, the posts 170 can also be placed between the side roof sections 148 and the side deck 104 when the roof structure 94a is in the down position to support the side roof sections 148. It is also contemplated that the posts 170 can be securely fastened to the side roof sections 148 and the side deck 104 or side frame, with the side deck 104 including cut out portions that allow the side deck 104 to move to the folded condition around the posts 170.

Figure 22:
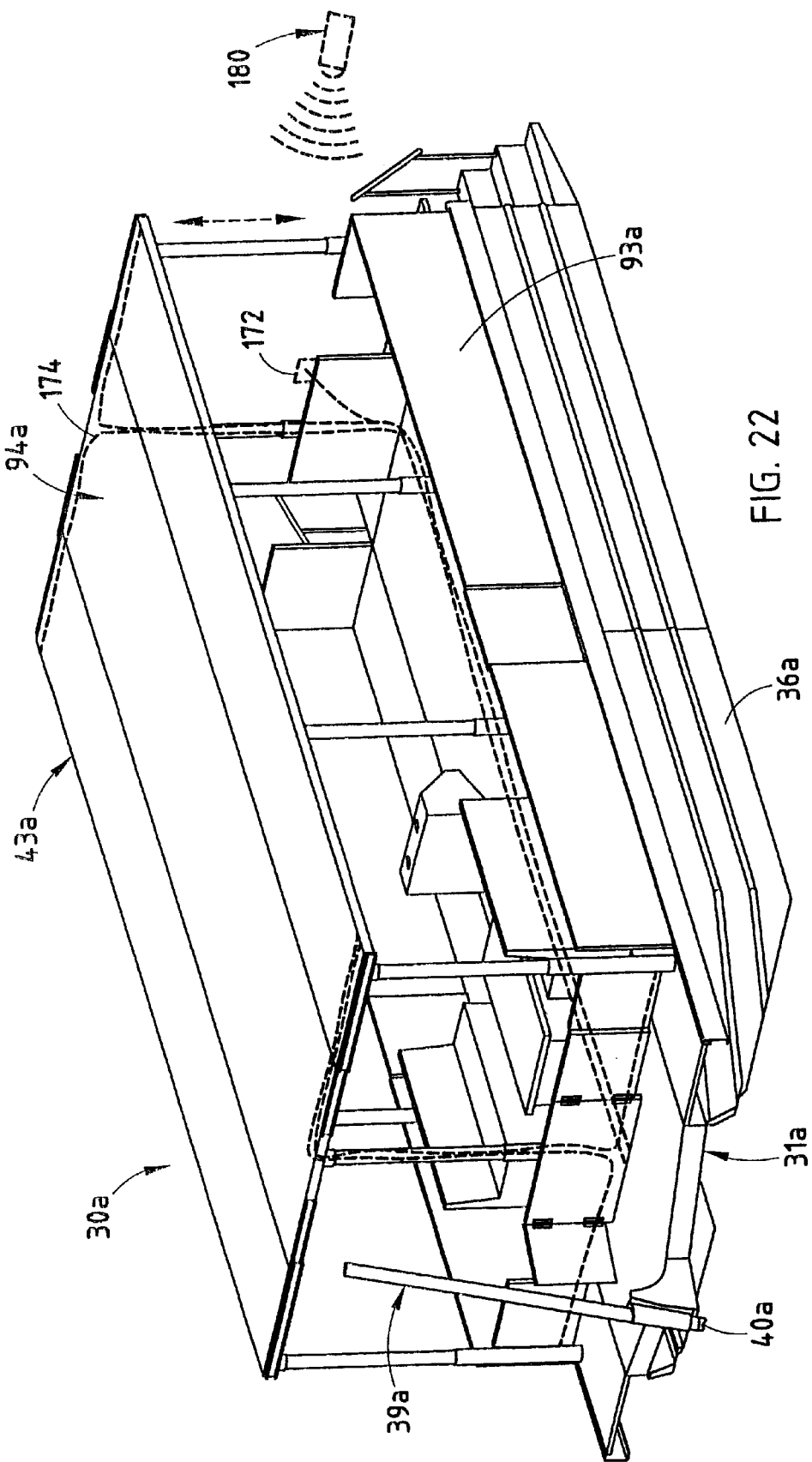
FIG. 22 is a top front perspective view of the apparatus of FIG. 12 including a remote control for moving the side frames and side decks between the retracted and expanded positions.

As shown in FIG. 22, the illustrated apparatus 30a can also include an actuator 172 operably connected to the main frame 31a and adapted to move the side frames 132A–132C and the side decks 104 between the retracted and expanded positions. The actuator 172 can include a gas or electric powered motor connected to a pulley or chain system 174 configured to rotate on sprockets or pulley wheels within at least one of the main frame 31a and side frames 132A–132C, the main deck 102 and the side decks 104 and/or the main roof 146 and the side roof sections 148. The actuator 172 is adapted to alternatively move the main frame 31a and side frames 132A–132C between the extended and retracted positions, the main deck 102 and the side decks 104 between the extended and retracted positions, and the main roof 146 and the side roof sections 148 between the extended and retracted positions. It is contemplated that the actuator 172 could move the posts 150 (and/or posts 170 if the posts 170 are fixed to the apparatus) between the extended and retracted positions. It is further contemplated that the actuator 172 could move the parts to only one of the extended or retracted positions. In the illustrated example, a remote control 180 communicates to a receiver on the apparatus 30a. The receiver operates the actuator 172 for sequentially moving the deck structure 53a, the main frame 31a and the roof structure 94a between the retracted and expanded positions. It is contemplated that the apparatus 30a could have a wheel frame actuator connected to the hydraulic cylinder 73a to move the wheel frame 34a between the extended and retracted positions. Remote control devices are well known in the art, such that a detailed description is not required. For example, a suitable remote control device is made by Omnex Control Systems of British Columbia under the trade name ORIGA.

Figure 4:
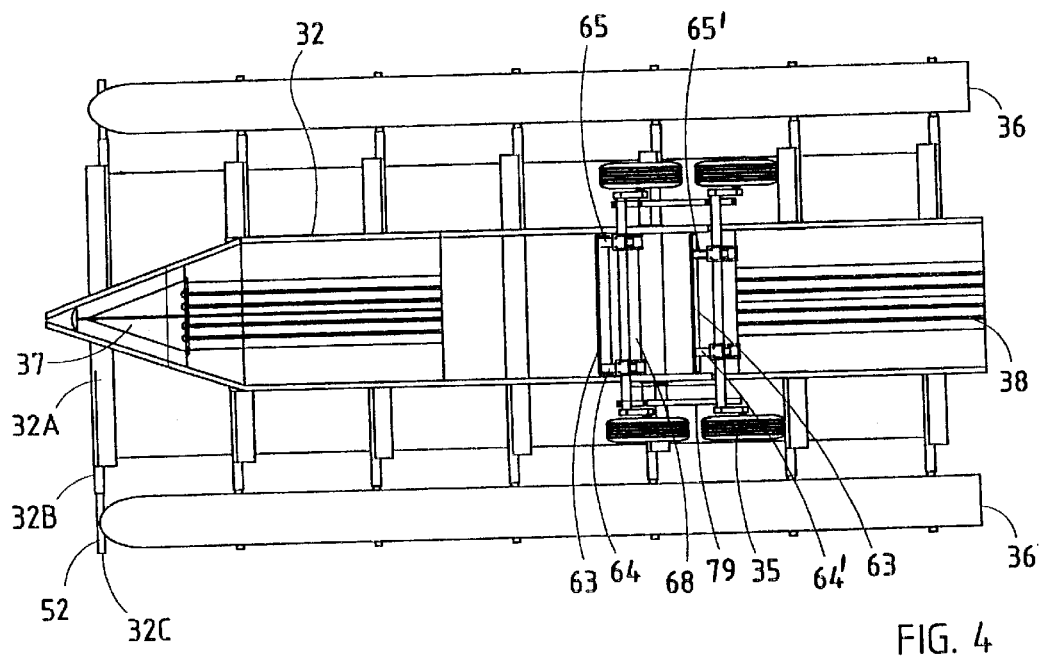
FIG. 4 is a top view of FIG. 3.

Notably, in apparatus 30a (FIG. 15) the front center pontoon has been eliminated (compare to FIGS. 3–4). It has been found that by eliminating the front center pontoon and further by changing a cross-sectional shape and nose portion of the outer pontoons 36a, that the present apparatus 30a floats in a flat position on the water and further motors across the water with less drag. In particular, a nose portion of the pontoons 36a includes relatively flat inner side walls and angled bottom and outer side walls forming a more streamlined channel for water flowing between the pontoons 36a. Also, the pontoons 36a are somewhat enlarged to provide improved side stability.

In the foregoing description, those skilled in the art will readily appreciate that modifications may be made to the invention without departing from the concepts disclosed herein. Such modifications are to be considered as included in the following claims, unless these claims by their language expressly state otherwise.

The invention claimed includes:

1. A pontoon and trailering apparatus comprising:
   a main frame with pontoons and retractable wheels, the main frame having opposing sides;
   a roof structure including a main roof supported over the main frame and including side roof sections operably attached to the main roof, the side roof sections each being telescopingly and movably supported on the main roof for movement between a retracted position where the side roof sections are positioned in a collapsed laminar arrangement with the main roof, and an expanded position where the side roof sections are positioned in an outwardly-telescoped parallel arrangement with the main roof.

2. The pontoon and trailering apparatus of claim 1, wherein:
   the side roof sections include rollers and the main roof includes channels; and
   the rollers of the side roof sections are configured to roll within the channels of the main roof as the side roof sections move between the retracted position and the expanded position.

3. The pontoon and trailering apparatus of claim 1, wherein:
   each of the side roof sections include an upper side roof panel and a lower side roof panel configured to sandwich the main roof therebetween in the collapsed laminar arrangement when the side roof sections are in the retracted position.

4. The pontoon and trailering apparatus of claim 1, further including:
   at least one post extending between the main frame and the roof structure, the at least one post being configured to maintain the roof structure in an up position.

5. The pontoon and trailering apparatus of claim 4, wherein:
   the at least one post is removable.

6. The pontoon and trailering apparatus of claim 4, wherein:
   the at least one post includes at least one fixed post and at least one removable post.

7. The pontoon and trailering apparatus of claim 6, wherein:
   the at least one removable post extends between the main frame and one of the side roof sections.

8. The pontoon and trailering apparatus of claim 1, wherein:
   the main frame has opposing sides and includes retractable side frames that are movable between expanded and retracted positions on the main frame.

9. The pontoon and trailering apparatus of claim 8, further including:
   a deck structure including a main deck attached to the main frame and side decks attached to the side frames, the side decks each being hinged and foldable and being configured to move to a folded condition when the side frames are moved to the retracted positions, and being configured to move to a flat condition when the side frames are moved to the expanded positions.

10. The pontoon and trailering apparatus of claim 9, wherein:
    the side decks include a spring hinge biasing the side decks to the folded condition.

11. The pontoon and trailering apparatus of claim 9, wherein:
    the deck structure includes a partition structure including first partitions attached to the main deck and second partitions attached to the side decks.

12. The pontoon and trailering apparatus of claim 11, wherein:
    the first partitions include first overlapping panels and the second partitions include second overlapping panels;
    the first and second panels are generally aligned and parallel when the side frames are in the expanded position; and
    the first and second panels slide past each other to an overlapped condition when the side frames are moved toward the retracted position.

13. The pontoon and trailering apparatus of claim 11, wherein:
    the first partitions include doors.

14. The pontoon and trailering apparatus of claim 1, further including:
    an actuator operably connected to the main frame and adapted to move the side roof sections between the retracted and expanded positions.

15. The pontoon and trailering apparatus of claim 14, further including:
    a remote control for operating the actuator for moving the side roof sections between the retracted and expanded positions.

16. A pontoon and trailering apparatus comprising:
    a main frame with pontoons and retractable wheels, the main frame having opposing sides and including retractable side frames that are movable between expanded and retracted positions on the main frame; and
    a deck structure including a main deck attached to the main frame and side decks attached to the side frames, the side decks each being hinged and foldable and being configured to move to a folded condition when the side frames are moved to the retracted positions, and being configured to move to a flat condition when the side frames are moved to the expanded positions, wherein:
    the side decks include a spring hinge biasing the side decks to the folded condition.

17. The pontoon and trailering apparatus of claim 16, wherein:
    the deck structure includes a partition structure including first partitions attached to the main deck and second partitions attached to the side decks.

18. The pontoon and trailering apparatus of claim 16, further including:
    a roof structure supported over the main frame.

19. A pontoon and trailering apparatus comprising:
a main frame with pontoons and retractable wheels, the main frame having opposing sides and including retractable side frames that are movable between expanded and retracted positions on the main frame; and
a deck structure including a main deck attached to the main frame and side decks attached to the side frames, the side decks each being hinged and foldable and being configured to move to a folded condition when the side frames are moved to the retracted positions, and being configured to move to a flat condition when the side frames are moved to the expanded positions wherein:
the deck structure includes a partition structure including first partitions attached to the main deck and second partitions attached to the side decks, wherein:
the first partitions include first overlapping panels and the second partitions include second overlapping panels;
the first and second panels are generally aligned and parallel when the side decks are in the expanded position; and
the first and second panels slide past each other to an overlapped condition when the side frames are moved toward the retracted position.

20. The pontoon and trailering apparatus of claim 19, wherein:
the first partitions include doors.

21. A pontoon and trailering apparatus comprising:
a main frame with pontoons and retractable wheels, the main frame having opposing sides and including retractable side frames that are movable between expanded and retracted positions on the main frame; and
a deck structure including a main deck attached to the main frame and side decks attached to the side frames, the side decks each being hinged and foldable and being configured to move to a folded condition when the side frames are moved to the retracted positions, and being configured to move to a flat condition when the side frames are moved to the expanded positions, further including:
a roof structure supported over the main frame, wherein:
the roof structure includes a main roof supported over the main frame and side roof sections operably attached to the main roof.

22. The pontoon and trailering apparatus of claim 21, wherein:
the side roof sections are each telescopingly and movably supported on the main roof for movement between a retracted position where the side roof sections are positioned in a collapsed laminar arrangement with the main roof, and an expanded position where the side roof sections are positioned in an outwardly-telescoped parallel arrangement with the main roof.

23. The pontoon and trailering apparatus of claim 22, wherein:
the side roof sections include rollers and the main roof includes channels; and
the rollers of the side roof sections are configured to roll within the channels of the main roof as the side roof sections move between the retracted position and the expanded position.

24. The pontoon and trailering apparatus of claim 22, wherein:
each of the side roof sections include an upper side roof panel and a lower side roof panel configured to sandwich the main roof therebetween in the collapsed laminar arrangement when the side roof sections are in the retracted position.

25. The pontoon and trailering apparatus of claim 21, further including:
at least one post extending between the main frame and the roof structure, the at least one post being configured to maintain the roof structure in an up position.

26. The pontoon and trailering apparatus of claim 21, further including:
an actuator operably connected to the main frame and adapted to move the side frames and the side decks between the retracted and expanded positions.

27. The pontoon and trailering apparatus of claim 26, further including:
a remote control for operating the actuator for moving the side frames and side decks between the retracted and expanded positions.

28. A pontoon and trailering apparatus comprising:
a main frame with pontoons and retractable wheels, the main frame having opposing sides and including retractable side frames that are movable between expanded and retracted positions on the main frame; and
a deck structure including a main deck attached to the main frame and side decks attached to the side frames, the side decks each being hinged and foldable and being configured to move to a folded condition when the side frames are moved to the retracted positions, and being configured to move to a flat condition when the side frames are moved to the expanded positions, further including:
steps attached to one of the pontoons and the side deck; the steps, when the side decks are in the expanded position, leading from the main deck down to water level, and the steps, when the side decks are in the folded position, being at least partially covered and protected by one of the main frame and the main deck.

29. A pontoon and trailering apparatus comprising:
a main frame with pontoons and retractable wheels, the main frame having opposing sides and including retractable side frames that are movable between expanded and retracted positions on the main frame; and
a deck structure including a main deck attached to the main frame and side decks attached to the side frames, the side decks each being movable to a retracted position and to an expanded position, the deck structure including a partition structure including first partitions attached to the main deck, and second partitions attached to the side decks;
the first partitions including first overlapping panels, and the second partitions including second overlapping panels, the first and second panels being generally aligned and parallel when the side decks are in the expanded position, and the first and second panels sliding past each other to an overlapped condition when the side decks are moved toward the retracted position.

30. The pontoon and trailering apparatus of claim 29, wherein:
the side decks include a spring hinge biasing the side decks to the retracted position.

31. The pontoon and trailering apparatus of claim 29, wherein:

the first partitions include doors.

32. The pontoon and trailering apparatus of claim 29, further including:
an actuator operably connected to the main frame and adapted to move the side frames and the side decks between the retracted and expanded positions.

33. The pontoon and trailering apparatus of claim 32, further including:
a remote control for operating the actuator for moving the side frames and side decks between the retracted and expanded positions.

34. The pontoon and trailering apparatus of claim 29, further including:
steps attached to one of the pontoons and the side deck; the steps, when the side decks are in the expanded position, leading from the main deck down to water level, and the steps, when the side decks are in the retracted position, being at least partially covered and protected by one of the main frame and the main deck.

35. A pontoon and trailering apparatus comprising:
a main frame with pontoons and retractable wheels, the main frame having opposing sides and including retractable side frames that are movable between expanded and retracted positions on the main frame; and
a deck structure including a main deck attached to the main frame and side decks attached to the side frames, the side decks each being movable to a retracted condition when the side frames are moved to the retracted positions, and being configured to be moved to an expanded condition when the side frames are moved to the expanded positions;
steps attached to one of the pontoons and the side deck; the steps, when the side decks are in the expanded condition, leading from the main deck down to water level, and the steps, when the side decks are in the retracted condition, being at least partially covered and protected by one of the main frame and the main deck.

36. A pontoon and trailering apparatus comprising:
a main frame with pontoons and retractable wheels, the main frame having opposing sides and side frames operably connected to the main frame for movement between retracted and expanded positions;
an expandable deck structure including a main deck attached to the main frame, and including side decks attached to the side frames;
an actuator operably connected to the main frame and adapted to move the side frames and the side decks between the retracted and expanded positions; and
a remote control for operating the actuator for moving the side frames and side decks between the retracted and expanded positions, wherein:
the side decks include a spring hinge biasing the side decks to a folded condition.

37. The pontoon and trailering apparatus of claim 36, wherein:
the deck structure includes a partition structure including first partitions attached to the main deck and second partitions attached to the side decks.

38. A pontoon and trailering apparatus comprising:
a main frame with pontoons and retractable wheels, the main frame having opposing sides and side frames operably connected to the main frame for movement between retracted and expanded positions;
an expandable deck structure including a main deck attached to the main frame, and including side decks attached to the side frames;
an actuator operably connected to the main frame and adapted to move the side frames and the side decks between the retracted and expanded positions; and
a remote control for operating the actuator for moving the side frames and side decks between the retracted and expanded positions, wherein:
the deck structure includes a partition structure including first partitions attached to the main deck and second partitions attached to the side decks, wherein:
the first partitions include first overlapping panels and the second partitions include second overlapping panels;
the first and second panels are generally aligned and parallel when the side decks are in the expanded position; and
the first and second panels slide past each other to an overlapped condition when the side decks are moved toward the retracted position.

39. The pontoon and trailering apparatus of claim 38, wherein:
the first partitions include doors.

40. The pontoon and trailering apparatus of claim 38, further including:
a roof structure supported over the main frame.

41. A pontoon and trailering apparatus comprising:
a main frame with pontoons and retractable wheels, the main frame having opposing sides and side frames operably connected to the main frame for movement between retracted and expanded positions;
an expandable deck structure including a main deck attached to the main frame, and including side decks attached to the side frames;
an actuator operably connected to the main frame and adapted to move the side frames and the side decks between the retracted and expanded positions; and
a remote control for operating the actuator for moving the side frames and side decks between the retracted and expanded positions, further including:
a roof structure supported over the main frame, wherein:
the roof structure includes a main roof supported over the main frame and side roof sections operably attached to the main roof.

42. The pontoon and trailering apparatus of claim 41, wherein:
the side roof sections are each telescopingly and movably supported on the main roof for movement between a retracted position where the side roof sections are positioned in a collapsed laminar arrangement with the main roof, and an expanded position where the side roof sections are positioned in an outwardly-telescoped parallel arrangement with the main roof.

43. The pontoon and trailering apparatus of claim 42, further including:
a roof remote control for operating a roof actuator for moving the side roof sections between the retracted and expanded positions.

44. A pontoon and trailering apparatus comprising:
a main frame with opposing sides, the main frame including longitudinally-extending beams and transverse beams supported by the longitudinally-extending beams;
a retractable wheel frame including wheels, axles, and subframe members, the subframe members supporting the axles and being vertically movably connected to the main frame;

side pontoons operably supported on the opposing sides by the transverse beams for movement between an outwardly-expanded position where a center area is open for receiving the wheel frame and an inwardly-contracted position where the center area is not sufficiently open to receive the wheel frame;

a center rear pontoon.

45. The pontoon and trailering apparatus of claim 44, further including:

a roof structure supported over the main frame.

46. The pontoon and trailering apparatus of claim 45, wherein:

the roof structure includes a main roof supported over the main frame and side roof sections operably attached to the main roof.

47. The pontoon and trailering apparatus of claim 46, wherein:

the side roof sections are each telescopingly and movably supported on the main roof for movement between a retracted position where the side roof sections are positioned in a collapsed laminar arrangement with the main roof, and an expanded position where the side roof sections are positioned in an outwardly-telescoped parallel arrangement with the main roof.

48. The pontoon and trailering apparatus of claim 47, wherein:

the side roof sections include rollers and the main roof includes channels; and the rollers of the side roof sections are configured to roll within the channels of the main roof as the side roof sections move between the retracted position and the expanded position.

49. The pontoon and trailering apparatus of claim 47, wherein:

each of the side roof sections include an upper side roof panel and a lower side roof panel configured to sandwich the main roof therebetween in the collapsed laminar arrangement when the side roof sections are in the retracted position.

50. The pontoon and trailering apparatus of claim 44, further including:

a deck structure including a main deck attached to the main frame and side decks attached to the side frames, the side decks each being hinged and foldable and being configured to move to a folded condition when the side frames are moved to the retracted positions, and being configured to move to a flat condition when the side frames are moved to the expanded positions.

51. The pontoon and trailering apparatus of claim 50, further including:

an actuator operably connected to the main frame and adapted to move the side frames between the retracted and expanded positions and the side decks between the folded and flat conditions.

52. The pontoon and trailering apparatus of claim 51, further including:

a remote control for operating the actuator for moving the side frames between the retracted and expanded positions and the side decks between the folded and flat conditions.

53. A pontoon and trailering apparatus comprising:

a main frame with opposing sides, the main frame including longitudinally-extending beams and transverse beams supported by the longitudinally-extending beams;

a retractable wheel frame including wheels, axles, and subframe members, the subframe members supporting the axles and being vertically movably connected to the main frame;

side pontoons supported on the opposing sides by the transverse beams, the side pontoons being positioned to define a cavity under a center area of the main frame for receiving the wheel frame and wheels; and a center rear pontoon.

54. The pontoon and trailering apparatus of claim 53, further including:

a roof structure supported over the main frame.

55. The pontoon and trailering apparatus of claim 54, wherein:

the roof structure includes a main roof supported over the main frame and side roof sections operably attached to the main roof.

56. The pontoon and trailering apparatus of claim 55, wherein:

the side roof sections are each telescopingly and movably supported on the main roof for movement between a retracted position where the side roof sections are positioned in a collapsed laminar arrangement with the main roof, and an expanded position where the side roof sections are positioned in an outwardly-telescoped parallel arrangement with the main roof.

57. The pontoon and trailering apparatus of claim 56, wherein:

the side roof sections include rollers and the main roof includes channels; and the rollers of the side roof sections are configured to roll within the channels of the main roof as the side roof sections move between the retracted position and the expanded position.

58. The pontoon and trailering apparatus of claim 56, wherein:

each of the side roof sections include an upper side roof panel and a lower side roof panel configured to sandwich the main roof therebetween in the collapsed laminar arrangement when the side roof sections are in the retracted position.

59. The pontoon and trailering apparatus of claim 56, further including:

a deck structure including a main deck attached to the main frame and side decks attached to the side frames, the side decks each being hinged and foldable and being configured to move to a folded condition when the side roof sections are moved to the retracted positions, and being configured to move to a flat condition when the side roof sections are moved to the expanded positions.

60. The pontoon and trailering apparatus of claim 59, further including:

an actuator operably connected to the main frame and adapted to move the side roof sections between the retracted and expanded positions.

61. The pontoon and trailering apparatus of claim 60, further including:

a remote control for operating the actuator for moving the side roof sections between the retracted and expanded positions.

* * * * *

UNITED STATES PATENT AND TRADEMARK OFFICE
CERTIFICATE OF CORRECTION

PATENT NO. : 6,725,796 B2
DATED : April 27, 2004
INVENTOR(S) : Donald L. Mensch

It is certified that error appears in the above-identified patent and that said Letters Patent is hereby corrected as shown below:

Column 2,
Line 54, "moved" should be -- move --.

Drawings,
Figure 14A, "132c" should be -- 132C --.

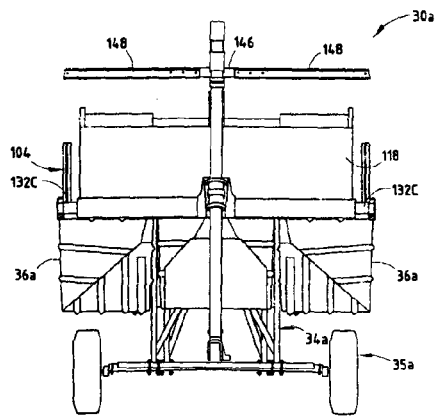

Figures 15, 16:
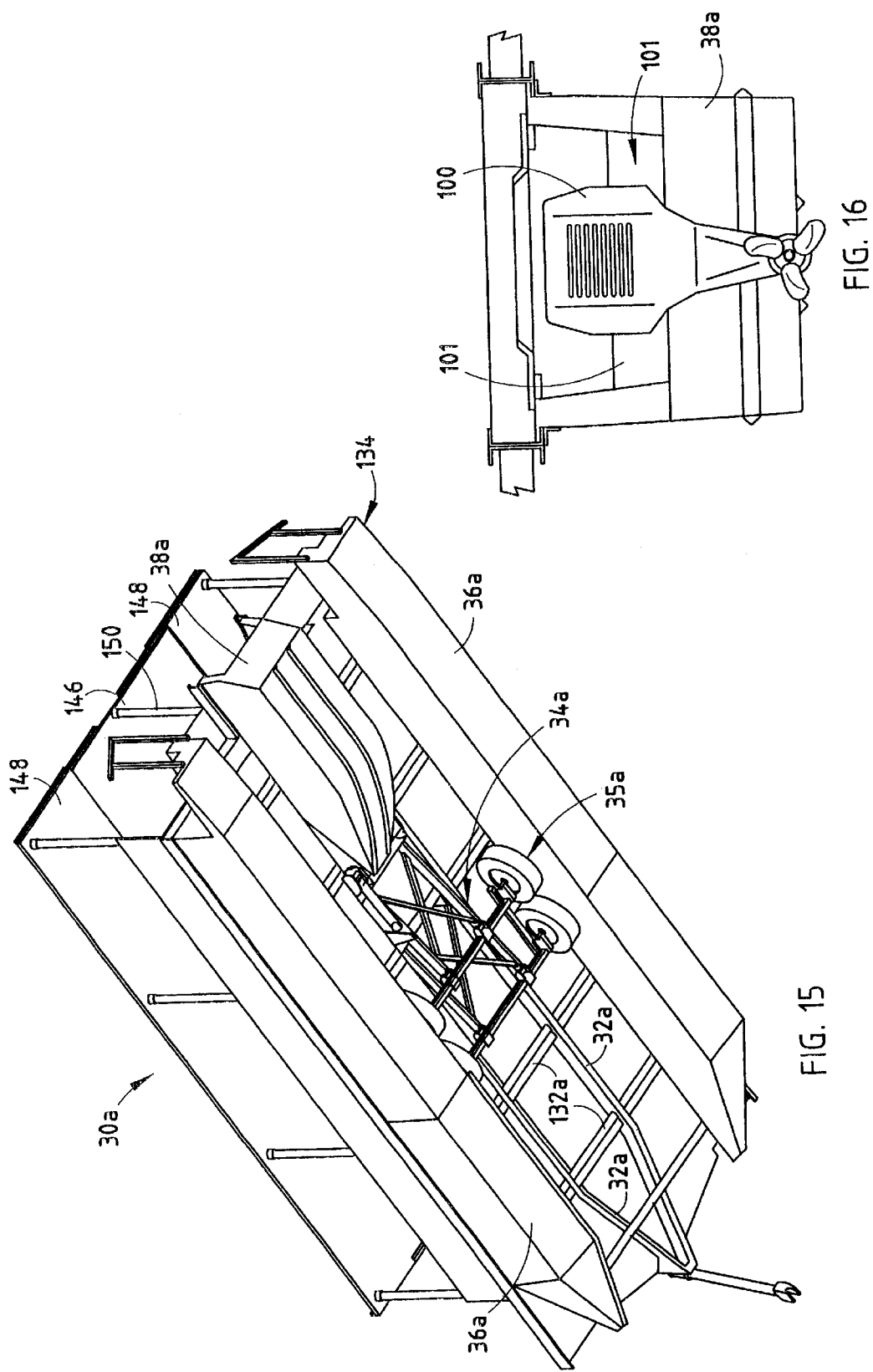
FIG. 15 is a bottom rear perspective view of the apparatus of FIG. 12 in the fully extended position.
FIG. 16 is a rear view of the apparatus of FIG. 12 illustrating the motor.

Figure 15, "132a" should be -- 132A --.

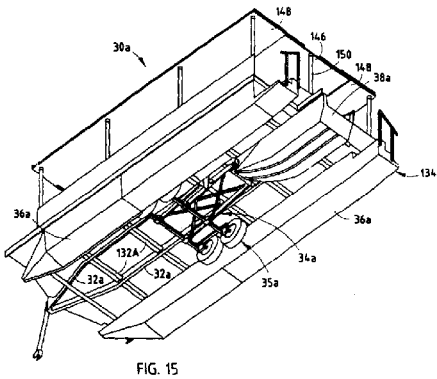

UNITED STATES PATENT AND TRADEMARK OFFICE
CERTIFICATE OF CORRECTION

Figure 17:
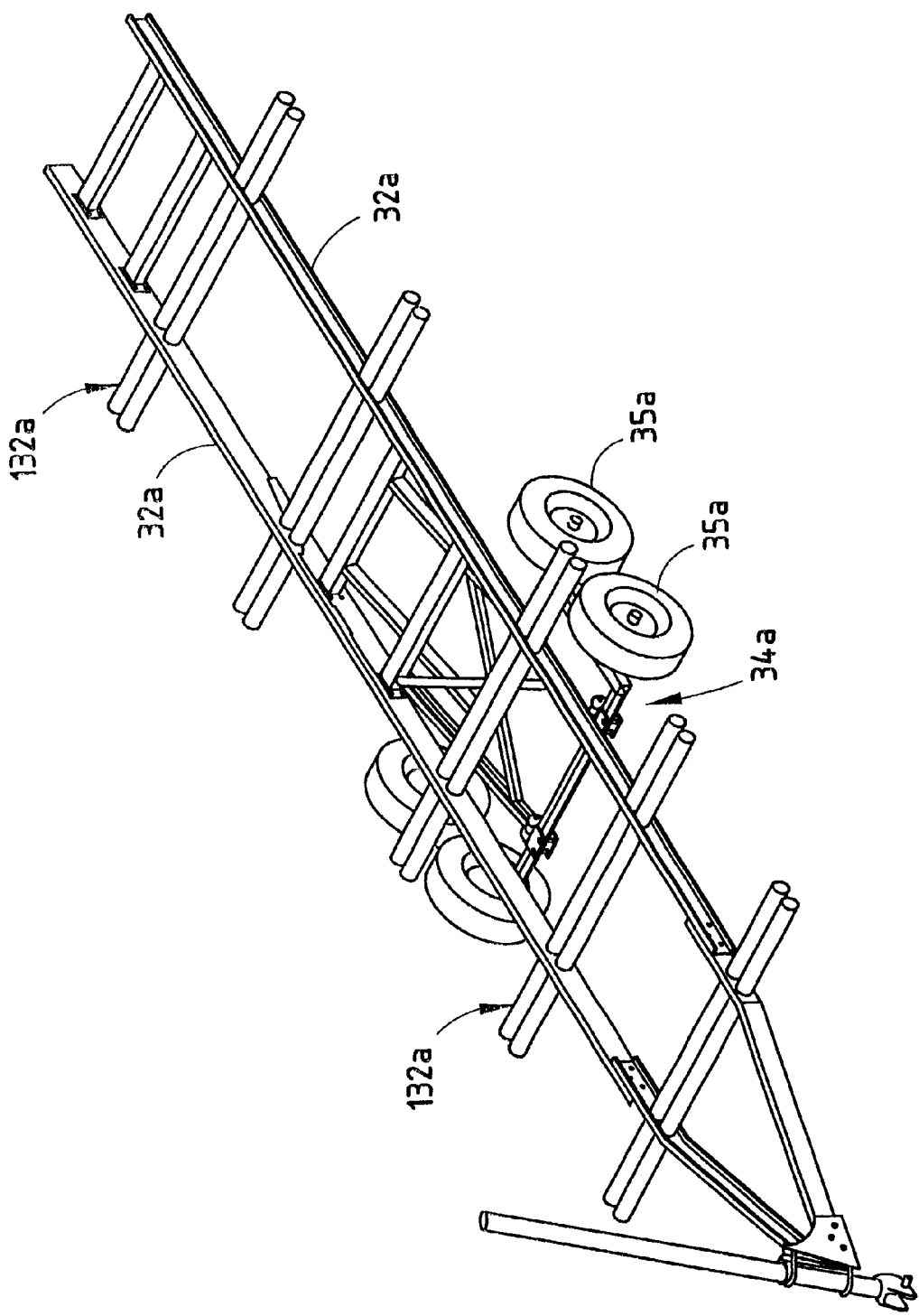
FIG. 17 is a top front perspective view of the frame of the apparatus of FIG. 12.

PATENT NO.   : 6,725,796 B2
DATED        : April 27, 2004
INVENTOR(S)  : Donald L. Mensch It is certified that error appears in the above-identified patent and that said Letters Patent is hereby corrected as shown below:

Drawings (cont'd),
Figure 17, "132a" should be -- 132A --.

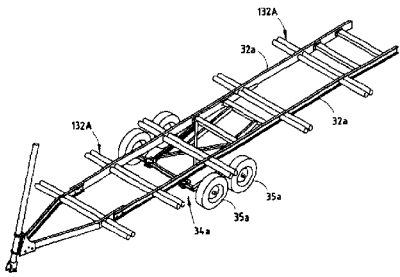

Figure 18, "132a" should be -- 132A --; and "132b" should be -- 132B --.

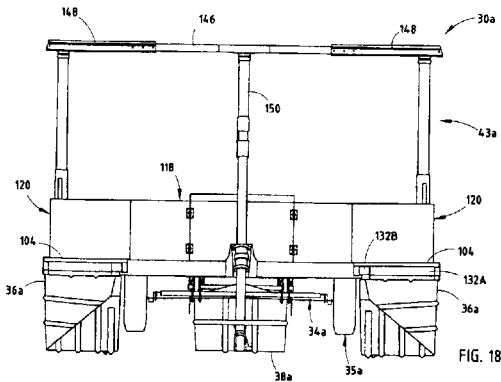

Signed and Sealed this

Twenty-fourth Day of August, 2004

JON W. DUDAS
*Director of the United States Patent and Trademark Office*